US010853635B2

(12) United States Patent
Ampatzidis et al.

(10) Patent No.: US 10,853,635 B2
(45) Date of Patent: Dec. 1, 2020

(54) AUTOMATED SYSTEMS AND METHODS FOR MONITORING AND MAPPING INSECTS IN ORCHARDS

(71) Applicant: University of Florida Research Foundation, Inc., Gainesville, FL (US)

(72) Inventors: Ioannis Ampatzidis, Fort Myers, FL (US); Philip Anzolut Stansly, Labelle, FL (US); Victor Henrique Meirelles Partel, Immokalee, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 0 days.

(21) Appl. No.: 16/505,927

(22) Filed: Jul. 9, 2019

(65) Prior Publication Data

US 2020/0019765 A1 Jan. 16, 2020

Related U.S. Application Data

(60) Provisional application No. 62/696,089, filed on Jul. 10, 2018.

(51) Int. Cl.
*H04N 5/247* (2006.01)
*G06K 9/00* (2006.01)
*G06K 9/62* (2006.01)
*G06N 20/00* (2019.01)

(52) U.S. Cl.
CPC ....... *G06K 9/00362* (2013.01); *G06K 9/6256* (2013.01); *G06N 20/00* (2019.01); *H04N 5/247* (2013.01)

(58) Field of Classification Search
CPC ... G06K 9/00362; G06K 9/6256; G06N 20/00
USPC ........................................................ 348/135
See application file for complete search history.

(56) References Cited

U.S. PATENT DOCUMENTS 7,496,228 B2 * 2/2009 Landwehr et al. .... H04N 5/247
382/170

OTHER PUBLICATIONS

Abdulridha, J., Ampatzidis, Y., Ehsani, R., de Castro, A., 2018. Evaluating the Performance of Spectral Features and Multivariate Analysis Tools to Detect Laurel Wilt Disease and Nutritional Deficiency in Avocado. Comput. Electron. Agric. 155, 203-2011 Dec. 2018.
Abdulridha, J., Ehsani, R., Abd-Elrahman, A., Ampatzidis, Y., 2019. A Remote Sensing technique for detecting laurel wilt disease in avocado in presence of other biotic and abiotic stresses. Comput. Electron. Agric. 156, 549-557.
Albrecht, U., and Bowman, K.D., 2009. Candidatus Liberibacter asiaticus and huanglongbing effects on citrus seeds and seedlings. Horticultural Science 44, 1967-73.
(Continued)

*Primary Examiner* — Nguyen T Truong
(74) *Attorney, Agent, or Firm* — Thomas | Horstemeyer, LLP

(57) ABSTRACT

Disclosed is an automated tap and detection system (ATDS) for monitoring insects on vegetation. The ATDS can automatically agitate vegetation and collect deposits released from the vegetation in response to the agitation. Images of the deposits can be collected and analyzed using machine learning models to determine a type of deposit (e.g., insect) collected and a number of deposits collected.

18 Claims, 21 Drawing Sheets

(56) References Cited

OTHER PUBLICATIONS

Ammar, E-D., Shatters, R.G.Jr, Lynch, C., Hall, D.G., 2011. Detection and relative titer of Candidatus Liberibacter asiaticus in the salivary glands and alimentary canal of Diaphorina citri (Hemiptera: Psyllidae) vector of citrus huanglongbing disease. Ann. Entomol. Soc. Am. 104, 526-33.

Ammar, E-D., Shatters, R.G.Jr, Lynch, C., Hall D.G., 2010. Localization of Candidatus Liberibacter asiaticus, associated with citrus huanglongbing disease, in its psyllid vector using fluorescence in situ hybridization. J. Phytopathol. 159, 726-34.

Ampatzidis, Y., de Bellis, L., Luvisi, A., 2017. iPathology: robotic applications and management of plants and plant diseases. Sustainability, 9 (6), 1010; doi:10.3390/su9061010.

Ampatzidis, Y.G., Kiner, J., Abdolee, R., Ferguson, L., 2018. Voice-Controlled and Wireless Solid Set Canopy Delivery (VCW-SSCD) System for Mist-Cooling. Sustainability, Special Issue: Information and Communications Technologies (ICT) for Sustainability, 10 (2), 421; doi:10.3390/su10020421.

Ampatzidis, Y., Whiting, M.D., Scharf, P.A., Zhang, Q., 2012. Development and evaluation of a novel system for monitoring harvest labor efficiency. Comput. Electron. Agric. 88, 85-94.

Ampatzidis, Y., Wortman, R., Tan, L., Whiting, M., 2016. Cloud-Based Harvest Management Information System for Hand-Harvested Specialty Crops. Comput. Electron. Agric. 122, 161-167.

Arevalo, H.A., Stansly, P.A., Fraulo A., Qureshi, J., Buss L.J., 2012. Tap sampling for Asian citrus psyllid (ACP) field sheet. SWFREC—IFAS, Immokalee, Florida, USA.

Boina, D.R., Meyer, W.L., Onagbola E.O., Stelinski, L.L., 2009. Quantifying dispersal of Diaphorina citri (Hemiptera: Psyllidae) by immunomarking and potential impact of unmanaged groves on commercial citrus management. Environ. Entomol. 38, 1250-58.

Bové, J.M., 2006. Huanglonbing: A destructive, newly-emerging, century-old disease of citrus. Plant Pathol. 88, 7-37.

Chung, K.R., and Brlansky, R.N., 2005. Citrus Diseases Exotic to Florida: Huanglongbing (CitrusGreening). Plant Pathology Department Fact Sheet PP-210, Florida Cooperative Extension Service, Institute of Food and Agricultural Sciences, University of Florida. http://edis.ifas.ufl.edu/PP133.

Court, C.D., Hodges, A.W., Rahmani, M., Spreen, T.H., 2017. Economic Contributions of the Florida Citrus Industry in 2015-16. Food and Resource Economics Department, Gainesville, Florida, https://fred.ifas.ufl.edu/media/fredifasufledu/photos/economic-impact/Economic-Impacts-of-the-Florida-Citrus-Industry-2015-16.pdf.

Court, C.D., Hodges, A.W., Stair, C., Rahmani, M., 2018. Economic Contributions of the Florida Citrus Industry in 2016-17. Food and Resource Economics Department Gainesville, Florida.

Cruz, A.C., Ampatzidis, Y., Pierro, R., Materazzi, A., Panattoni, A., de Bellis, L., Luvisi, A., 2019. Detection of Grapevine Yellows Symptoms in *Vitis vinifera* L. with Artificial Intelligence. Comput. Electron. Agric., 157, 63-76.

Cruz, A.C., Luvisi, A., De Bellis, L., Ampatzidis, Y., 2017. X-FIDO: An Effective Application for Detecting Olive Quick Decline Syndrome with Novel Deep Learning Methods. Frontiers, Plant Sci., Oct. 10, 2017 | https://doi.org/10.3389/fpls.2017.01741.

Garnier, M., and Bové, J.M., 1996. Distributions of the Huanglonbing (Greening) Liberobacter Species in Fifteen African and Asian Countries. In: "Proceedings of the 13th Conference of the International Organization of Citrus Virologists" (eds. da Graça, J. V., Moreno, P. and Yokomi, R. K.) IOCV, Riverside, pp. 388-391.

Gottwald, T.R., 2007 Citrus canker and citrus huanglongbing, two exotic bacterial diseases threatening the citrus industries of the Western Hemisphere. Outlooks on Pest Management 18, 274 279.

Güçlü, U., and Van, G.M.A, 2014. Deep neural networks reveal a gradient in the complexity of neural representations across the brain's ventral visual pathway. arXiv preprint arXiv:1411.6422.

Halbert, S.E., and Manjunath, K.L., 2004. Asian citrus psyllids (Sternorrhyncha: Psyllidae) and greening disease of citrus: a literature review and assessment of risk in Florida. Florida Entomologist 87, 330-353.

Hall, D.G., Hentz, M.G., Ciomperlik, M.A., 2007. A comparison of traps and stem tap sampling for monitoring adult Asian citrus psyllid (Hemiptera: Phyllidae) in citrus. Fla. Entomol. 90, 327-34.

Hall, D.G., and Hentz, M.G., 2010. Sticky Trap and Stem—Tap Sampling Protocols for the Asian Citrus Psyllid (Hemiptera: Psyllidae). J. Econ. Entomol. 103, 541-49.

Hall, D.G., Richardson, M.L., Ammar, E-D., Halbert, S.E., 2013. Asian citrus psyllid, Diaphorina citri, vector of citrus huanglongbing disease. Entomol. Exp. Appl., 146 (2013), 207-223.

Hodges, A.W., and Spreen, T.H., 2012. Economic Impacts of Citrus Greening (HLB) in Florida, 2006/07-2010/011. University of Florida, Institute of Food and Agricultural Science, Gainesville, FL, USA, 2012. EDIS document FE903.

Inoue, H., Ohnishi, J., Ito, T., Tomimura, K, Miyara, S., Iwanami T., Ashihara, W., 2009. Enhanced proliferation and efficient transmission of Candidatus Liberibacter asiaticus by adult Diaphorina citri after acquisition feeding in the hymphal stage. Ann. Appl. Biol. 155, 29-36.

Jagoueix, S., Bové, J.M., Garnier M., 1994. The Phloem-Limited Bacterium of Greening Disease of Citrus Is a Member of the alpha-subdivision of the Proteobacteria. Int. J. Syst. Bacteriol. 44, 379-386.

Krizhevsky, A., Sutskever, I., Hinton, G.E., 2012. ImageNet Classification with Deep Convolutional Neural Networks. In Proc. Advances in Neural Information Processing Systems 25, 1090-1098.

Lewis-Rosenblum, H., 2011. Seasonal and long-range movement of Asian citrus psyllid, Diaphorina citri. MS thesis. Univ. Florida, Gainesville, 75 pp.

Moller, J., 2010. Computervision a versatile technology in automation of agricultural machinery. In: 21st. Annual Meeting, Bologna, EIMA International, Nov. 13-14, 2010.

Monzo, C., Arevalo, H.A., Jones, M.M., Vanaclocha, P., Croxton, V, Qureshi J.A., Stansly, P.A., 2015. Sampling methods for detection and monitoring of the Asian citrus psyllid (Hemiptera: Psyllidae). Environ. Entomol. 1-9; DOI:10.1093/ee/nvv032.

Monzo, C., Qureshi, J.A., Stansly, P.A., 2014. Insecticide sprays, natural enemy assemblages and predation on Asian citrus psyllid, Diaphorina citri (Hemiptera: Psyllidae). Bulletin of Entomological Research, available on CJO2014. doi:10.1017/S0007485314000315.

Monzo, C., and Stansly, P.A., 2017. Economic injury levels for Asian citrus psyllid control in process oranges from mature trees with high incidence of huanglongbing. PloS one, 12(4), p. e0175333.

Moran, P.J., Pat, J. M., Cabanillas, H.E., Adamczyk, J.A.Jr, Jackson, M.A., Dunlap, Christopher, A., Hunter, Wayne, B., Avery, Pasco, B., 2011. Localized autoinoculation and dissemination of Isaria fumosorosea for control of the Asian citrus psyllid in South Texas. Subtropical Plant Science, 63, 23-35.

Partel, V., Kakarla, S.C., Ampatzidis, Y., 2019. Development and Evaluation of a Low-Cost and Smart Technology for Precision Weed Management Utilizing Artificial Intelligence. Comput. Electron. Agric. 157, 339-350.

Tiwari, S., Mann, R.S., Rogers, M.E., Stelinski, L.L., 2011. Insecticide resistance in field populations of Asian citrus psyllid in Florida. Pest Management Science, 67, 1258-1268.

Redmon, J., and Farhadi, A., 2018. Yolov3: An incremental improvement. arXiv 2018, arXiv:1804.02767.

Samson, R. A., 1974. Paecilomyces and some allied Hyphomycetes. Studies in Mycology 6, 1-119.

Singerman, A., 2018. Cost of Production for Processed Oranges in Southwest Florida, 2016/171. Food and Resource Economics Department, UF/IFAS Extension, FE1038, http://edis.ifas.ufl.edu/pdffiles/FE/FE103800.pdf.

Spensa Tech, Z-Trap, https://www.dtn.com/wpcontent/uploads/2018/07/ss_dtn_smart_trap_1018.pdf.

Stansly, P.A., Arevalo, H.A., Qureshi, J., 2010. Monitoring methods for Asian citrus psyllid. Citrus Industry 91, 20-22.

Subandiyah, S., Nlkoh, N., Sato, H., Wagiman, F., Tsyuymyu, S., Fukatsu, T., 2000. Isolation and characterization of two entomopathogenic fungi attacking Diaphorina citri (Homoptera, Psylloidea) in Indonesia. Mycoscience 41, 509-513.

\* cited by examiner

1. Place back side of this sheet 1 foot under the branch to be sampled

2. Tap the selected branch with a PVC tube or hand 3 times

3. Quickly count the insects (beneficials and pests) that fall onto the paper. Pay special attention to ACP 4. Write the number of insects from each sample on the provided datasheet for later reference and entry into a database

AUTOMATED SYSTEMS AND METHODS FOR MONITORING AND MAPPING INSECTS IN ORCHARDS

CROSS-REFERENCE TO RELATED APPLICATION

This application claims the benefit of U.S. Provisional Application Ser. No. 62/696,089, filed Jul. 10, 2018, the disclosure of which is hereby incorporated by reference in its entirety, including all figures, tables and drawings.

BACKGROUND

Specialty crop growers face challenges from numerous diseases and pests. For example, the Asian citrus psyllid (ACP) is a key pest of citrus due to its role as vector of huanglongbing (HLB) (greening disease). There is no known cure for HLB, but vector management is critical, both for slowing spread and attenuating symptoms in infected trees. Therefore, monitoring the ACP population, as well as other pest populations, is an essential management component for timing and assessment of control actions. Manual crop scouting is often labor intensive and time consuming.

BRIEF DESCRIPTION OF THE DRAWINGS

Many aspects of the present disclosure can be better understood with reference to the following drawings. The components in the drawings are not necessarily to scale, emphasis instead is being placed upon clearly illustrating the principles of the present disclosure. Moreover, in the drawings, like reference numerals designate corresponding parts throughout the several views.

FIG. 20 is a table illustrating results of an experiment using an ATDS according to various embodiments of the present disclosure.

DETAILED DESCRIPTION

Figure 1:
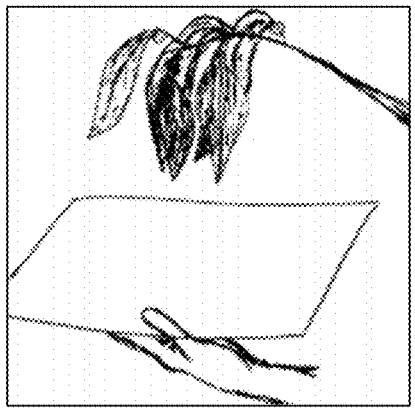
FIG. 1 is an example of a known method of pest detection in accordance with various embodiments of the present disclosure.
Figure 1:
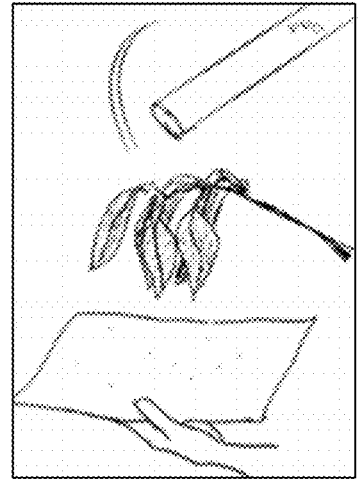
Figure 1:
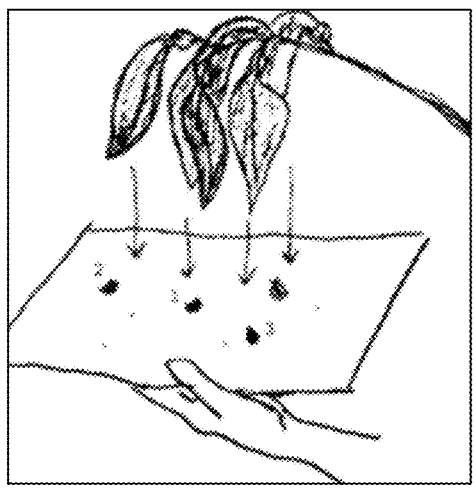
Figure 1:
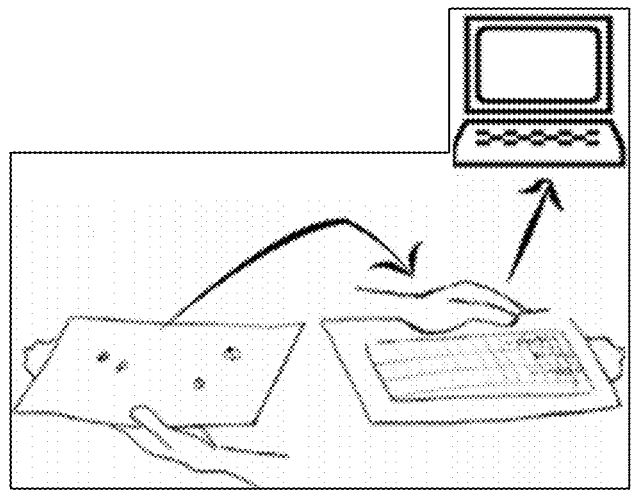

Disclosed herein are various embodiments related to an automated tap pest and beneficial pest system that is configured to detect and monitor pests to include primarily ACP, but also citrus leafminer adults, various weevils like _Diaprepes_, and Srilanka, even non-insect pests like spider mites in open-field citrus. Also detectable will be beneficial arthropods like spiders, ladybeetles and lacewing larvae (among others). Specifically, the automated tap and pest detection system of the present disclosure comprises a mobile platform configured to attach to a mobile vehicle (e.g., e.g., ATV, tractor, truck, variable rate sprayer, robotic system etc.). The mobile platform is configured to tap a sample from given branch onto a viewing stage. Cameras can be used to capture images of the viewing stage. The images are then processed and used to visualize, record, identify, and count the pests (e.g., ACP) that land on the viewing stage. While being developed for citrus, the system could be used in principal for other crops in the field or greenhouse.

The Huanglongbing (HLB), or citrus greening, is a significant disease that affects citrus orchards causing rapid decline of the trees. HLB was first reported in 1919 in southern China, and it is spread already to forty different countries all around the world, including the USA. The disease causes an immunologic resistance reduction affecting orange production by causing fruit drop and the production of small, misshapen and low-level of juice fruit with no economic value. The causal agent of HLB in the America and Asia is usually the _Candidatus_ Liberibacter asiaticus (CLas), a phloem limited gram-negative bacterium. In 17 years (between 2000 and 2017), the citrus cultivated area in Florida declined 45% and the volume production utilized declined by 71%, mainly due to problems generated by the HLB. Between 2012 and 2017 in Florida, citrus production revenue decreased approximately 47%, resulting in an average annual reduction of 7,945 jobs and $1.098 billion in industry output.

The HLB is transmitted by the vector _Diaphorina citri Kuwayama_, most known as Asian Citrus Psyllid (ACP) (Hemiptera: Phyllidae). It was verified in Florida for the first time in 1998. The transmission of the disease occurs in three steps: (i) an initial period of acquisition, when the nymphs and the adults come in contact with the pathogenic agent (CLas), (ii) a latency period, that may include a bacteria reproduction too and (iii) the inoculation period, where the vector transmits the bacteria (presents in the salivary glandules, muscles, tissue and ovaries) to the plant. The ACP can move about 100 meters (m) in three (3) days and recent data showed a dispersion distance of at least two kilometers (km) in twelve (12) days. This vector exhibits biological characteristics such as high reproduction capacity, fast population growth ratio and capacity to withstand a wide temperature range, which allows it to spread quickly. Bacteria control is becoming virtually unsustainable as robust methods of bacteria elimination are expensive and not effective. Therefore methods for monitoring and controlling the ACP populations are shown to be more advantageous in the prevention and mitigation of the citrus greening problem, allowing the treatment only in critical plants, saving time and reducing costs.

A known method to combat the ACP vector includes extensive chemical control programs, by the application of pesticides. However, empiric studies are showing that pesticides application to prevent the introduction and dissemination of ACP has not been very effective. Besides that, ACP populations have become more resistant to chemicals, which can become problematic without controlled use of pesticides. The use of biological agents as natural predators of the vector is another method of population control, in which case chemicals can reduce the effectiveness of the method. Fungi control was also reported as a good tool to control ACP populations. All the mentioned control methods should be supported by a strong geolocation analysis of ACP quantities, identifying most affected areas and generating accurate targets, both to chemical and biological control of the vector.

Monitoring the ACP population is an essential component of ACP management, both for application of economic thresholds as well as assessing effectiveness of control actions. For this purpose, the tap sample method (FIG. 1), which requires striking a randomly selected branch and counting ACP falling onto a sheet, has proven to be an efficient and reliable tool for assessing ACP numbers in the tree canopy. Spraying based on need as indicated by tap sample counts has been shown to reduce ACP management costs and conserve natural enemies. However, this tap sample manual counting method is very labor intensive and time consuming.

Machine vision techniques, internet of things (IoT) and cloud-based technologies can simplify pest scouting procedures and improve precision spraying applications, reduce labor cost, decrease data collection time, and produce critical and practical information. Rapid methods for early detection of pests and diseases can assist growers in making timely management decisions and to limit spread.

Machine vision along with artificial intelligence (AI) techniques has been increasingly applied to agriculture. Deep learning based convolutional neural networks (CNN) is the most common AI approach for image recognition and have proven to achieve great performance on image detection and classification tasks. The deep architecture and good weight equalization schemes of CNNs provide great sensitivity to detect complex and high level features. CNNs have the advantage to be trained from large sets of data, eliminating the need to manually design feature extraction algorithms. According to various embodiments, the present disclosure relates to an artificial intelligence technology utilizing deep learning that automates ACP scouting procedures in citrus orchards, providing rapid and valuable information to improve ACP management.

According to various embodiments, a trained deep-learning convolutional neural network (DL-CNN) can be used to distinguish, identify, and count the pests using grids of multiple cameras (e.g., RGB, multispectral, thermal, etc.). The identification, count, and location of pests detected can be transmitted to a remote database for storage and treatment plan development.

Traditional ACP Monitoring Methods

There are several methods to monitor ACP populations in order to determine the need to spray: (i) the yellow sticky trap which uses an adhesive board to collect psyllids for later visualization; however, sticky traps sampling is slow, labor intensive, costly and assesses ACP in flight, which may not always correlate well with numbers in trees; (ii) sweep nets, where a net of 15-inch diameter is used into the canopy of trees to collect insects; (iii) the tap sample method which uses a PVC stick to hit the tree's branches forcing the psyllids to fall over a white board positioned bellow to visualize the insects. Other known systems use computational machine vision to monitor insects collected on the device fixed in orchards.

The tap sample method is a common sampling method due to being a fast and low cost method as compared to other known methods. Tap sampling requires striking a randomly selected branch with a stick or length of PVC pipe and counting ACP adults falling onto a laminated sheet held below (FIG. 1). The tap sample has proved to be a fast and reliable tool for assessing ACP numbers in the tree canopy, and was adopted in 2011 by the United States Department of Agriculture (USDA) Animal Plant Health Inspection Service-Plant Protection and Quarantine (APHIS-PPQ) and the Florida Department of Agriculture and Consumer Services-Division of Plant Industry (FDACS-DPI) as an integral part of the citrus health response program (CHRP).

However, most successful growers supplement this government service with their own ACP monitoring system to provide block by block information needed to fine-tune ACP control. Accordingly it would be beneficial for a system that provides real-time georeferenced ACP incidence data could be used to mitigate spray delivery for development of a precision, target-based sprayer.

The automated, mobile, and intelligence vision-based tap and detection system of the present disclosure will rapidly and accurately detect and monitor pests primarily ACP, but also citrus leafminer adults, various weevils like *Diaprepes*, and Srilanka, even non-insect pests like spider in the field. Also detectable will be beneficial arthropods like spiders, ladybeetles and lacewing larvae. According to various embodiments, data can be transmitted via a network to a remote mapping program in real time. This automated tap and detection system can be mounted on a mobile vehicle and/or mobile platform (e.g., ATV, tractor, truck, variable rate sprayer, robotic system etc.).

According to various embodiments, the present disclosure includes hardware and software components. As will be discussed in more detail below, the hardware components may include: (i) a tapping/shaking mechanism to strike the tree's branches so that ACPs fall; (ii) a viewing board located below the tapping/shaking mechanism to collect the fallen ACPs for observation; (iii) a grid of high resolution cameras to acquire images of the board right after the tapping; (iv) camera's processor units to individually control each camera's image acquisition; (v) and a real-time kinematic Global Positioning System (RTK-GPS) to geolocate each tree and ACPs detection.

According to various embodiments, the software components configured to perform the post processing image detection include: (a) an image processing method; (b) a first convolutional neural network (CNN) object detection; and (c) a second CNN detection in order to accurately distinguish ACPs on images.

As will be discussed in greater detail below, the automated ACP detection procedure of the present disclosure includes the following steps. To begin, an operator places the system next to a tree branch. There are three movable axes for better positioning the system in a tree: (i) up & down; (ii) front and back; and (iii) rotational movement. Next, the "striking paddles" of the shaking system agitates the tree branches. An array (grid) of cameras collects pictures and an air blower system removes all the material from a viewing stage. A controller analyzes the images, detects, geolocates and counts ACP. Upon analysis of the images to detect geolocate and count the ACP, or other type of pest or beneficial, the unit moves to the next tree. According to various embodiments, a variable rate sprayer may be mounted at the front of a unit for real-time applications varying the amount of agro-chemical as a function of pest density.

Figure 2:
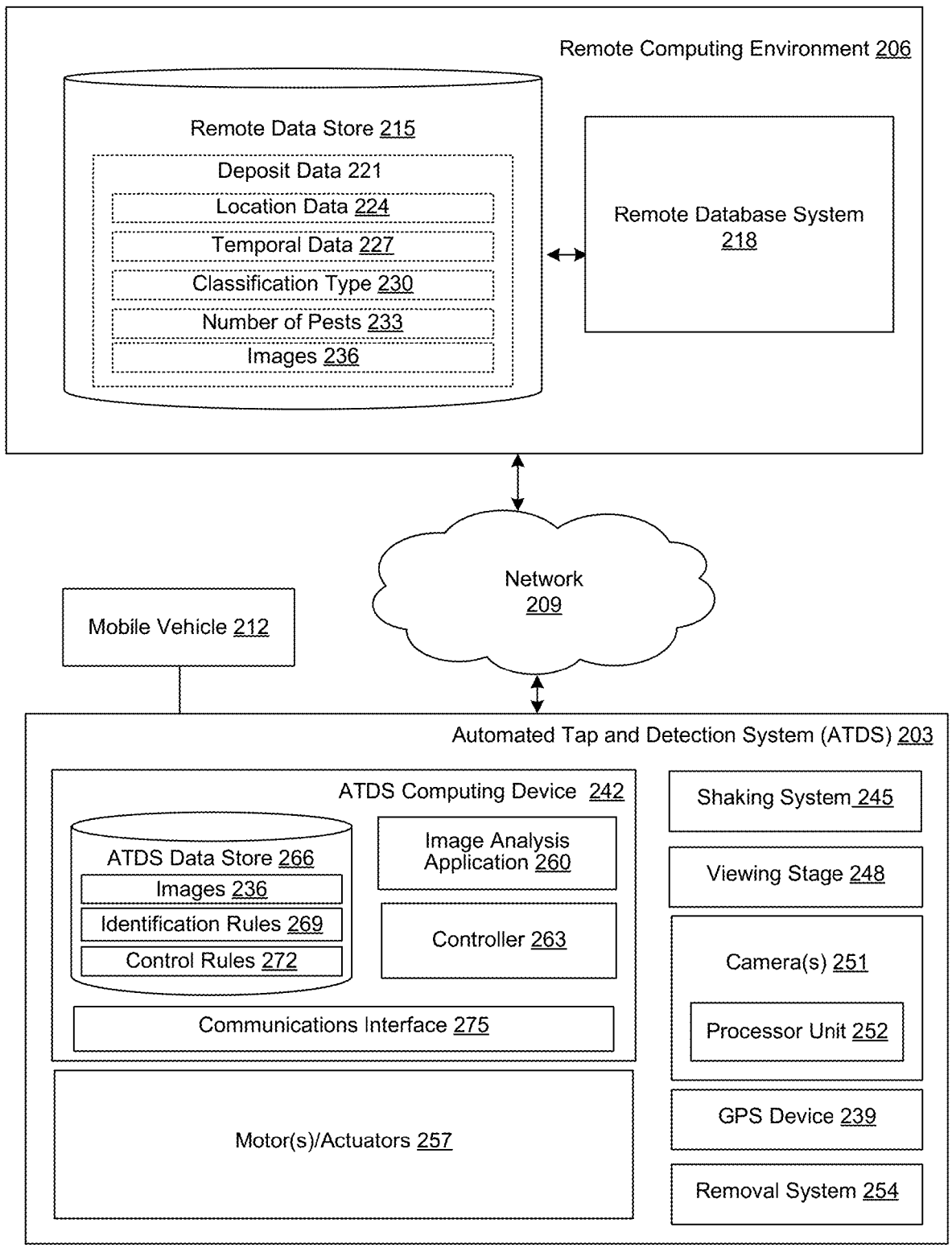
FIG. 2 is an example of a networked environment associated with an automated tap and detection system (ATDS), in accordance with various embodiments of the present disclosure.

Turning now to FIG. 2, shown is an example of a networked environment 200 associated with an automated tap and detection system (ATDS) 203 according to various embodiments of the present disclosure. The networked environment 200 includes a remote computing environment 206 and an automated tap and detection system (ATDS) 203 in data communication via a network 209. As shown in FIG. 2, the automated tap and detection system 203 is connected to a mobile vehicle 215 and/or platform. The network includes, for example, the Internet, intranets, extranets, wide area networks (WANs), local area networks (LANs), wired networks, wireless networks, cable networks, satellite networks, or other suitable networks, etc., or any combination of two or more such networks.

The remote computing environment 206 may comprise, for example, a computing device or any other system providing computing capability. Alternatively, the remote computing environment 206 may employ a plurality of computing devices that may be arranged, for example, in one or more server banks or computer banks or other arrangements. Such computing devices may be located in a single installation or may be distributed among many different geographical locations. For example, the remote computing environment 206 may include a number of computing devices that together comprise a hosted computing resource, a grid computing resource, and/or any other distributed computing arrangement. In some cases, the remote computing environment 206 may correspond to an elastic computing resource where the allotted capacity of processing, network, storage, or other computing-related resources varies over time.

Various applications and/or other functionality may be executed in the remote computing environment 206 according to various embodiments. Also, various data is stored in the remote data store 215 that is accessible to the remote computing environment 206. The remote data store may be representative of a plurality of data stores as can be appreciated. The data stored in the remote data store 215, for example, is associated with the collection of identification information obtained by the ATDS 203. The data stored in the remote data store 215 can further be associated with the operation of the various applications and/or functional entities described below.

The components executed on the remote computing environment 206, for example, include the remote database system 218, and other applications, services, processes, systems, engines, or functionality not discussed in detail herein. The remote database system 218 is executed to receive identification data from the ATDS 203 and store it in the remote data store 215. According to some embodiments, the remote database system 218 can further be executed to train, retrain, and/or refine machine learning models using the various captured images. The remote database system 218 can further be executed to retrieve data from the remote data store 215 and transmit to additional computing devices for review. The data stored in the remote data store 215 can be used to determine treatment plans for citrus and ultimately other tree and row crops.

The data in the remote data store 215 includes, for example, deposit data 221 and potentially other data. Deposit data 221 includes location data 224, temporal data 227 (e.g., date/time), classification type 230, number of deposits 233, images 236, and/or other deposit data as required. Location data 224 includes data associated with the location of where an identified deposit (e.g., pest, beneficial) was visualized. For example, the location data 224 can include the latitude and longitude where the identified pest or beneficial was visualized. For this purpose, the ATDS 203 may include a global positioning system (GPS) receiver 239 and/or other positioning device. When the ATDS 203 taps and/or shakes vegetation, the GPS receiver 239 can determine the location of the vegetation. This information can then be transmitted to the remote data store 215 (in real-time or near real-time) for storage and further reference as can be appreciated.

Temporal data 224 includes the date and time associated with the detection of pests on specific vegetation. The classification type 230 corresponds to the type insect identified (e.g., ACP, other pest, beneficial). The number of deposits 233 corresponds to the number of the type of deposit (e.g., type of pest or beneficial) identified at the viewing stage at the particular date/time. The images 239 may include those associated with the deposit identification. Images can be used in retraining and/or refining the machine learning models implemented by the ATDS computing device 242 and/or any other computing device as can be appreciated.

The mobile vehicle 212 may comprise an ATV, a tractor, a truck, a variable rate sprayer, a robotic system, and/or any other type of mobile vehicle as can be appreciated. The ATDS 203 may be attached to the mobile vehicle 212 as can be appreciated. The ATDS 203 may comprise an ATDS computing device 242, a shaking system 245, a viewing system 248, camera(s) 251, a GPS device 239, a removal system 254, motors/actuators 257, and/or any other system as can be appreciated.

The ATDS computing device 242 is representative of one or more ATDS computing devices that may be in data communication with the remote computing environment as well as the various systems of the ATDS 203. The ATDS computing device 242 may include, for example, a processor-based system be embodied in the form of a personal computer (e.g., a desktop computer, a laptop computer, or similar device), a mobile computing device (e.g., personal digital assistants, cellular telephones, smartphones, web pads, tablet computer systems, and similar devices), or other devices with like capability (e.g., NVidia Jetson TX2). The ATDS computing device 242 may include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display may be a component of the computing device or may be connected to the ATDS computing device 242 through a wired or wireless connection.

The ATDS computing device 242 may be configured to execute various applications including an image analysis application 260, a controller 263, and/or other applications. The image analysis application 260 may be executed to analyze images 236 captured from the camera(s) 251 (with or without micro lenses) to distinguish, identify, and count the pests from the images using a trained deep-learning convolutional neural network(s) (DL-CNN) or similar machine learning techniques (Artificial Intelligence). The DL-CNNs may be based on models generated by machine learning using a collection of images. In some embodiments, the image analysis application 260 can be configured to interact with one or more remote mapping systems that are trained to distinguish, identify, and count the deposits from the obtained images 236. In some embodiments, the models can be trained to ignore a deposit detected in a same exact spot as a previously analyzed image. For example, in some situations, the deposit may not be easily removed from the viewing stage by the removal system 254. As such, if the image analysis application 260 detects a deposit at the same location as a previously detected location, the image analysis application 260 may not consider the particular deposit in the count for the current image analysis.

The controller 263 may be embodied as analog, digital, or mixed analog and digital processing circuitry and memory that direct the operation of the electromechanical components of the ATDS 203. In that sense, the controller 263 can be an example of an embedded real-time control system in which control outputs are produced in response to control input conditions. The controller 263 may be executed to send commands to the various systems of the ATDS 203. For example, the controller 263 is configured to control the movement and operation of the shaking system 245, the camera(s) 251, the GPS device 239, the removal system 254, the motor(s)/actuator(s) 257, and/or any other component of the ATDS 203. These applications may also be executed to receive and process data from the various systems within the ATDS 203, the remote computing environment 206, and/or other entities as can be appreciated. These applications may further be executed to cause the ATDS computing device 242 to share or otherwise transmit the generated identification data with the remote computing environment 203 and/or another computing device or system.

Various data in the ATDS data store 266 are accessible to the ATDS computing environment 206. The ATDS data store 266 may be representative of a plurality of data stores as can be appreciated. The data stored in the ATDS data store 266 is associated with the operation of the various applications and/or functional entities described below.

Data stored in the ATDS data store 266 includes, for example, images 236, identification rules 269, control rules 272, and potentially other data. The images 236 can include a collection of images collected by the ATDS 203 and/or images collected by other devices. The images 236 can be used by the image analysis application 260 in the analysis of images of the viewing stage 248 that are captured by the camera(s) 251 for the detection, identification, and counting of the pests deposited on the viewing stage 248. The images 236 can be used in retraining and/or refining the machine learning models implemented by the ATDS computing device 242 and/or any other computing device as can be appreciated.

The identification rules 269 include rules and/or configuration data for the various algorithms and/or machine learning models used to detect, identify, and/or count the pests in each captured image. The control rules 272 include rules and/or configuration data used to control the various systems of the ATDS 203. For example, the control rules 272 can include various rules for controlling the positioning and functioning of the various systems, including the vertical, horizontal, and/or rotational movement of each of the different systems, including the shaking system 245, the viewing stage 248, the removal system 254, and/or other system. The control rules 272 may further include rules associated with the functioning and operation of the camera(s) 251, the GPS device 239, the motors/actuators 257, and or other components of the ATDS 203.

It should be noted that although shown in the ATDS computing device 242, in some embodiments, the image analysis application 260 may be executed in the remote computing environment 206, and/or other remote computing device. For example, the ATDS computing device 242 may be configured to transmit the captured images 236 to the remote computing environment 206 and/or any other computing environment that is configured to execute the image analysis application 260 for detecting, identifying, and counting pests from the captured images 236.

The shaking system 245 is configured to interact with a desired vegetation to shake loose deposits on the vegetation, such as, for example, pests, onto the viewing stage 248. In some embodiments, the shaking system 245 is configured to rotate at a fixed and/or variable about the vegetation causing the loose deposits to fall onto the viewing stage 248. In other embodiments, shaking system 245 is configured to vibrate at a fixed and/or variable frequency such that when the shaking system 245 is positioned about the desired vegetation, the shaking system 245 causes the pests, and other loose deposits, to fall onto the viewing station.

In some embodiments, as shown in FIGS. 3-6, 8, 9, 11, and 13 the shaking system 245 can comprise a primary rod 303 extending outwardly from and substantially perpendicular to a vertical frame of the ATDS. One or more secondary paddle components 306 may extend outwardly from and substantially perpendicular to the primary rotatable rod 303. In some embodiments, the primary rod 303 is configured to rotate about an axis of the primary rod 303. When the shaking system 245 is positioned next to desired vegetation, the rotation of the primary rod 303 can cause the one or more paddle components 306 to move the desired vegetation, thereby causing any pests, and/or other deposits, to fall from the vegetation onto the viewing stage 248. The one or more paddle components 306 can comprise tubes, plates, discs, and/or any other type of component as can be appreciated.

In some embodiments, the primary rod 303 may be configured to vibrate and/or rotate at a fixed and/or variable frequency. For example, the controller 263 can cause the shaking system 245 to vibrate and/or rotate at a slow frequency (e.g., 0.5 Hz) and/or a fast frequency (e.g., 10 Hz). Further, the controller 263 can cause the shaking system 245 to vary in frequency as can be desired. When positioned against the chosen vegetation, the vibration of the primary rod 303 can cause any pests, or other deposits, on the vegetation to fall on to the viewing stage 248. In some embodiments, the shaking system 245 may comprise a primary rod 303 that is configured to tap the vegetation to cause the deposits to fall onto the viewing stage 248. In some embodiments, the shaking system 245 does not include the one or more secondary rods.

Figure 13:
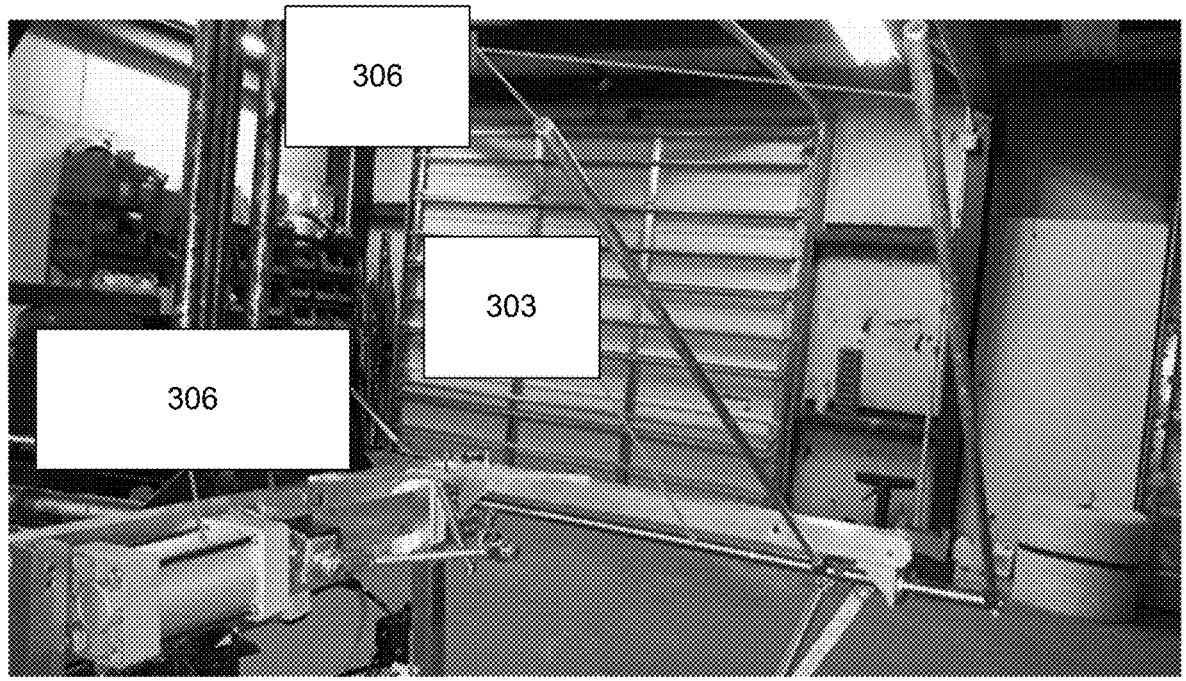

In one non-limiting example, the shaking system 245 can comprise a mechanism developed to perform a fast and consistent tapping on tree's branches. For example, the shaking system 245 can comprise a pneumatic cylinder 309 (FIG. 13) with a stroke of 50 mm (2 inches). A bore of about 63.5 mm (2.5 inches) can be used to turn a shaft 303 connected to two steel tapping rods 306 of about eight (8) mm diameter and about 0.6 m length (FIG. 13). The rods 306 may a stroke of about 80 degrees and were measured to achieve a speed of eight (8) m/s on their ends during the tapping procedure. Although specific dimensions are noted in the above example, the shaking system 245 is not limited to the exemplary dimensions provided, and can be of any size, shape, and orientation as can be appreciated.

The viewing stage 248 may comprise a non-sticky catching stage extending outwardly from and substantially perpendicular to the vertical frame of ATDS 203. According to various embodiments of the present disclosure, the viewing stage 248 is positioned in arrangement with the shaking system 245 such that when the shaking system 245 interrogates a given vegetation, the loose deposits (e.g., pests) from the vegetation drop onto the viewing stage 248. In some embodiments, the viewing stage 248 is transparent (e.g., FIGS. 7 and 8). In other embodiments, the viewing stage 248 is opaque or otherwise not transparent (e.g., FIGS. 3-6). In one non-limiting example, the viewing stage 248 may comprise an acrylic opaque white board that is easy to clean and reduces reflectance effects (e.g., FIG. 12).

Figure 6:
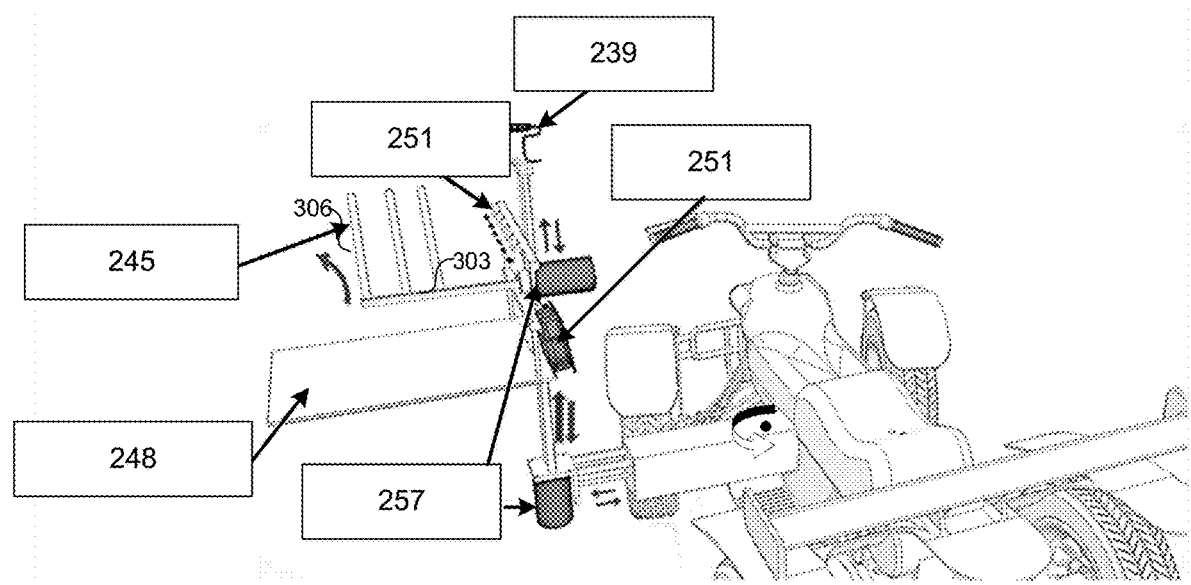

As shown in FIG. 6, the position of the viewing stage 248 can be raised or lowered about the vertical axis of the viewing stage 248 to allow for proper placement of the viewing stage 248 relative to the desired vegetation, as can be appreciated. For example, the viewing stage 248 can be coupled to one or more actuators and/or motors 257 which can be controlled to cause the viewing stage 248 to move for proper placement.

The camera(s) 251 can include RGB cameras, multispectral cameras, thermal cameras, and/or any other type of camera or image capturing device as can be appreciated. In some examples, the camera(s) 251 may be embodied as one or more cameras having a field of view of the viewing stage (with or without micro-lenses). Using the camera(s) 251, still images and/or video may be relayed to the image analysis application 260 to be analyzed. The images and/or video may be relied upon by the image analysis application 260 to determine the deposit information (e.g., identification, count, etc.) associated with one or more captured images 236. In some embodiments, the camera(s) 251 can include one or more cameras including micro-lenses to capture micro-sized insects.

Figure 4:
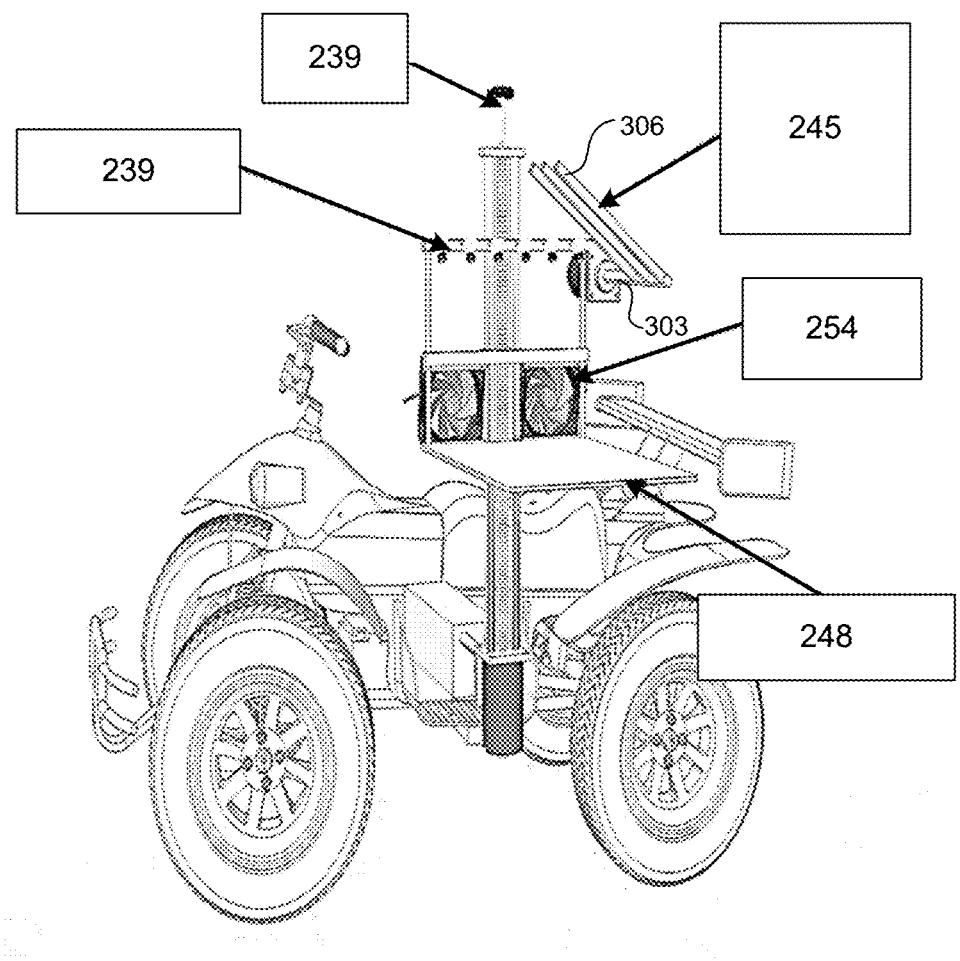
Figure 5:
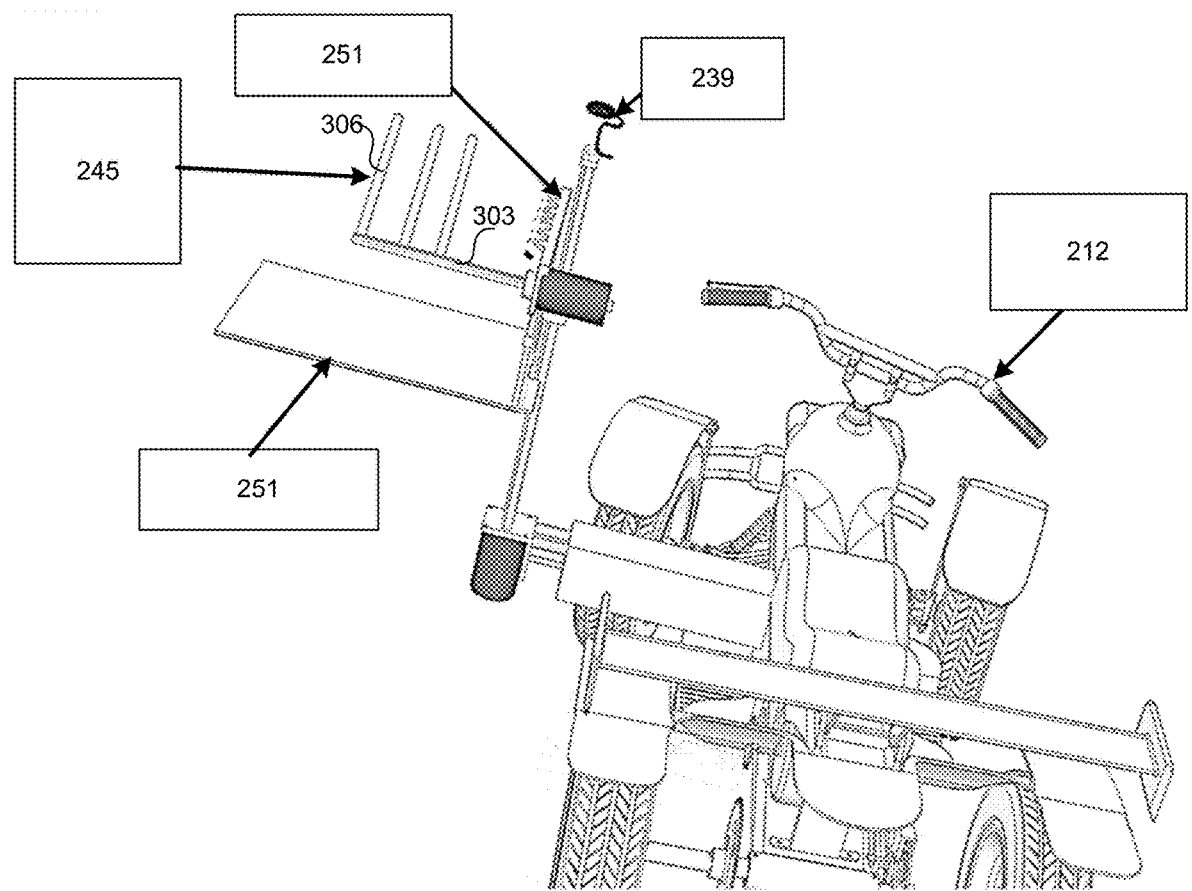
Figure 10A:
FIGS. 10A, 10B, 11, 12, 13, and 14 are photographs of examples of an ATDS and components according to various embodiments of the present disclosure.
Figure 10B:
Figure 11:
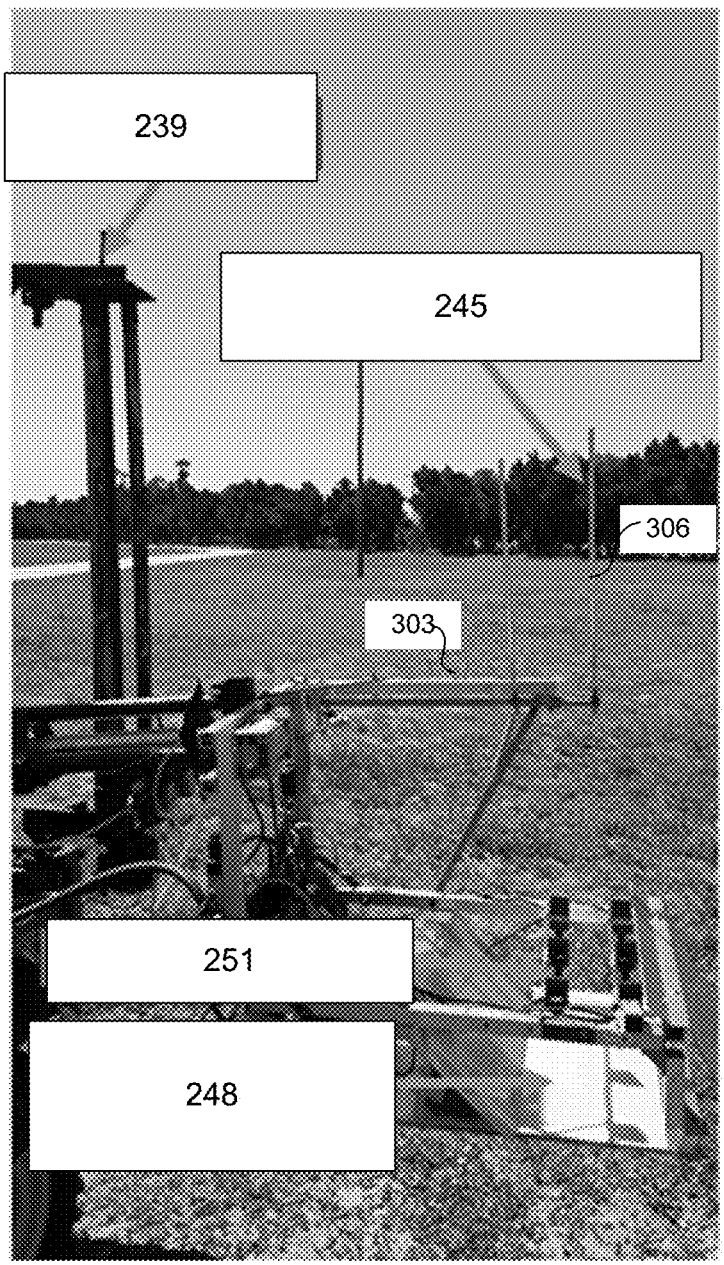
Figure 12:
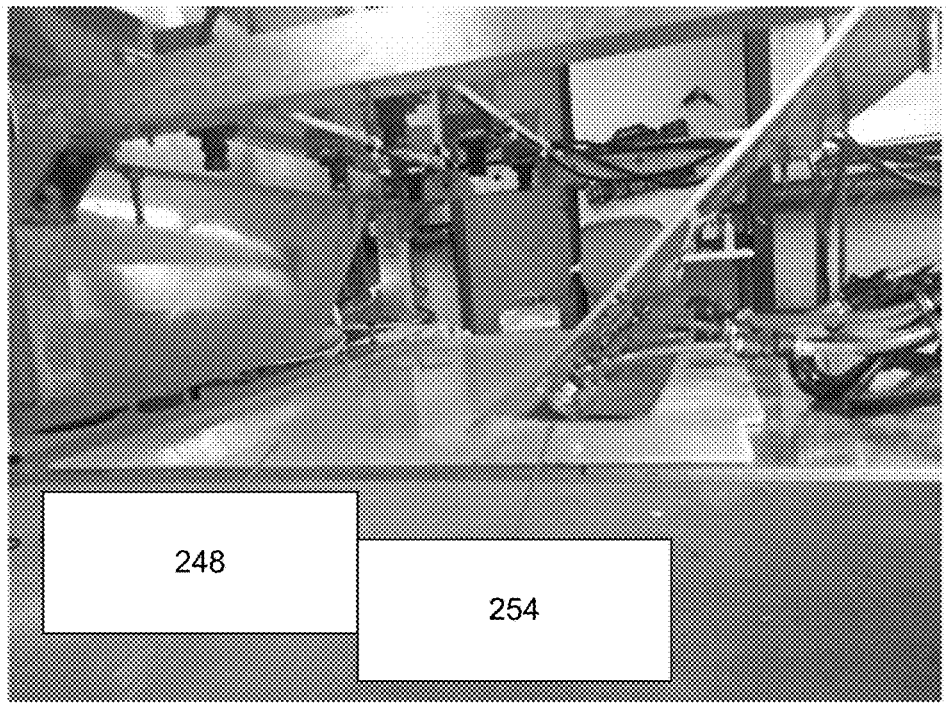
Figure 14:
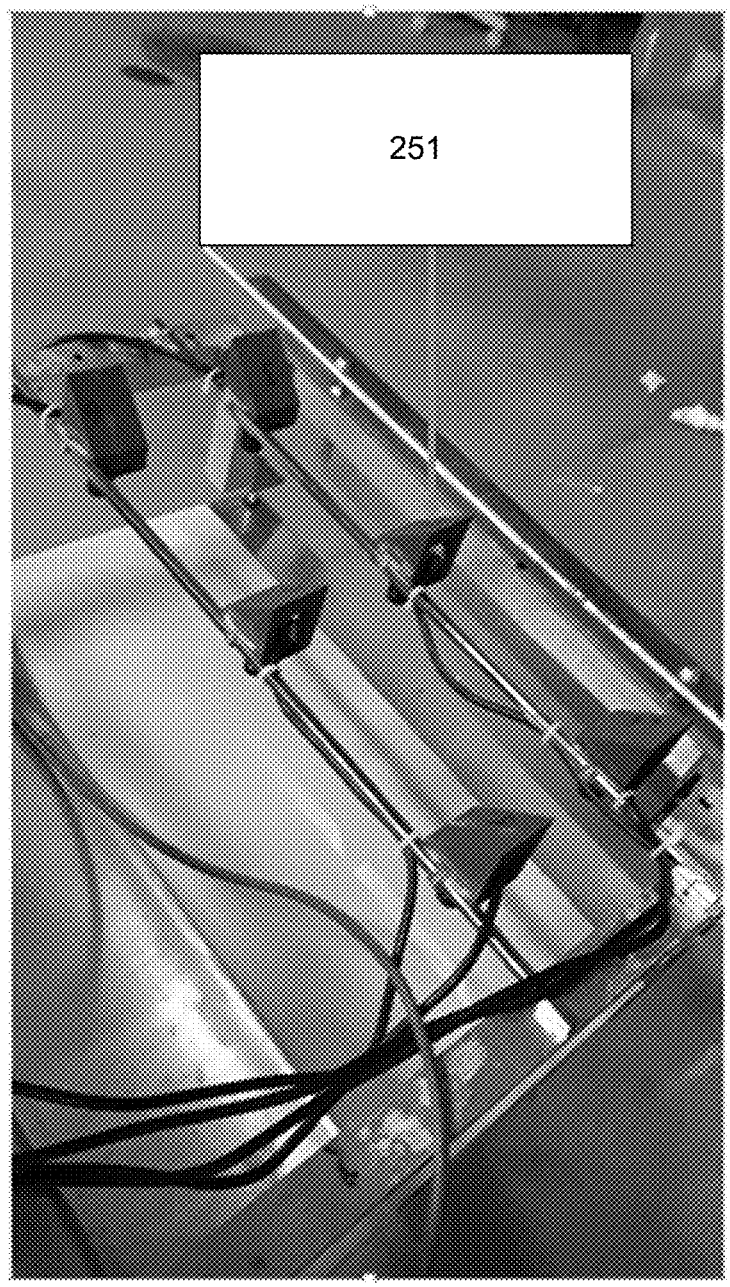

According to various embodiments, the camera(s) 251 can be positioned in any arrangement about the ATDS 203 that allows the camera(s) 251 to capture at least a portion of the viewing stage 248 as can be appreciated. In some embodiments, the camera(s) 251 can be positioned above the viewing stage 248, to the side of the viewing stage 248, and/or under the viewing stage 248. In other embodiments, the camera(s) 251 can be positioned within the viewing stage 248. For example, FIGS. 4-6 illustrate the cameras to the side and above the viewing stage 248. FIGS. 7, 8, 10A, and 10B, illustrate the camera(s) 251 being positioned below the viewing stage 248. FIGS. 11, 12, and 14 illustrate an example embodiment where the camera(s) 251 are positioned above the viewing stage 248. In these examples, the camera(s) 251 can capture the images of the deposits on the viewing stage 248. In some embodiments, camera(s) can be located at multiple positions (e.g., above, below, to the side, etc.) about the ATDS 203 to provide a greater accuracy. In some embodiments, the camera(s) 251 are arranged in an array of cameras to increase the accuracy.

In one non-limiting example, the camera(s) 251 can comprise a grid of high resolution USB cameras. FIGS. 7-12 and 14 provide examples of a grid of cameras. In the example of FIG. 11, the cameras 251 were placed so that each camera would cover a 0.15×0.11 m area of the viewing stage 248. The camera module used in FIG. 11 has eight (8) megapixels of resolution (3264×2448) and a lens of 3.6 mm focal length. However, it should be noted that the camera(s) 251 of the present disclosure is not limited to the resolution and focal length specifications provided above. In the example of FIG. 11, the grid is placed about 0.14 m above the viewing stage 248. The distance between the camera(s) 251 and the viewing stage 248 is not limited to 0.14 m and can be any dimension as can be appreciated. In some embodiments, the camera(s) 251 may be configured to acquire one channel images (greyscale) to reduce image processing operations. In other embodiments, the camera(s) 251 can be configured to acquire color images.

In some embodiments, each camera 251 can comprise a processor unit 252. In order to capture images at the same time in all six cameras 251 (within a 0.3 s tolerance), an individual processor unit 252 may be used in each camera module 251 to control the image acquisition. For example, a processor can comprise a Rasberry Pi v3, or any other type of processing unit as can be appreciated. In some examples, the processor unit 252 can be connected to each respective camera 251 through a USB cable. In an example experiment, all the processor units 252 were connected to each other through general-purpose input/output (GPIO) pins to trigger them at the same time. In the same experiment, one of the processors 252 was also connected to the pneumatic cylinder valve (to control the valve).

In the experiment, a camera application was created to be executed by the processors 252 to trigger the shaking system 245 two times within 0.5 seconds and then to trigger the image acquisition 0.5 seconds after the second tap. This delay was found to be suitable after trial-and-error tests as it is enough time for the insects to fall on the board, but it is not long enough so that insects start to fly away. It is important to have a consistent and fast tapping as the ACPs fly off the viewing stage 248 only seconds after falling.

The removal system 254 may comprise a fan and/or air blower system that is configured to blow air with a force capable of removing the deposits on the viewing stage 248 after every collection and/or measurement. In some examples, the removal system 254 may comprises a sweeper device (e.g., a brush) that is configured to sweep the viewing stage 248 with a brush. In some embodiments, the removal system 254 may not be able to remove every insect from the viewing stage 248. As such, the detection models may be trained to ignore insects that are located in a same location as one or more previously analyzed images.

The various motors and actuators 257 are configured to cause movement and/or operation of the various systems of the ATDS 203 as can be appreciated. For example, as shown in FIG. 6, one or more motors 257 can be controlled by the controller 263 to move the various components as desired. For example, the ATDS 203 can be moved away from or towards the mobile vehicle 212 as can be appreciated. In addition, the viewing stage 248 can be moved up and down in a vertical position to ensure the proper height for collecting deposits. Further, the shaking system 245 can be adjusted for proper placement.

The communications interface 275 may be embodied as one or more physical layer communications systems and associated software interfaces for communication between ATDS 203, the remote computing environment 206, remote mapping programs, and/or other computing devices via the network. In that context, the communications interface may include one or more wired or wireless (e.g., cellular, satellite, WiFi®, Bluetooth®, etc.) communications interfaces. Among other data, the communications interface 275 may be relied upon to transmit pest identification data to the remote computing environment as can be appreciated.

The GPS device 239 may be embodied as a receiver configured to receive and demodulate global positioning system beacons and identify the geographic location of the ATDS 203 as it moves from place to place. For example, in a non-limiting prototype, a real-time kinematic (RTK) GPS device 239 was used to provide position coordinates of each scouted tree. The device positioning accuracy was around 0.02 m, which was more than enough to locate and distinguish between trees. The developed software integrated the GPS location and the ACPs detection results to automatically generate maps of the scouted area results.

Figure 3:
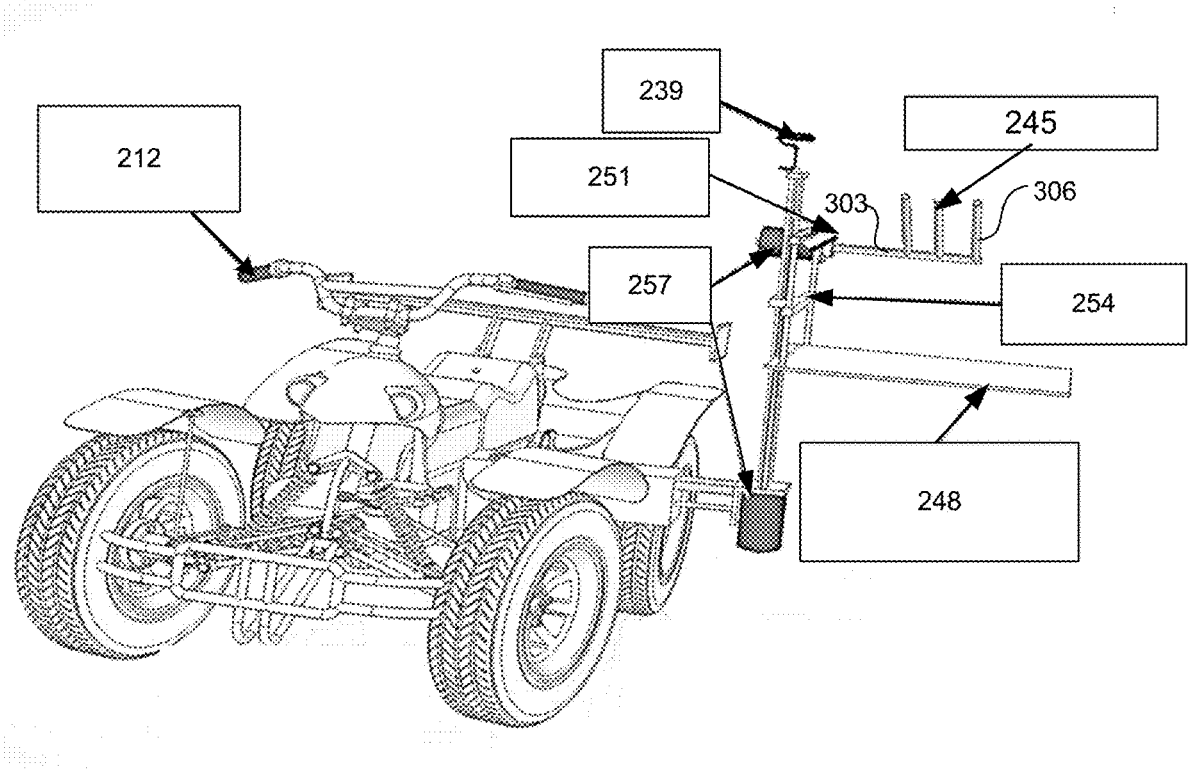
FIGS. 3-9 are examples of drawings of the ATDS according to various embodiments of the present disclosure.

Turning now to FIGS. 3-14, shown are various drawings of example mobile vehicles 212 comprising an ATDS 203 as well as components of the ATDS 203 according to various embodiments of the present disclosure. As shown in FIGS. 3-14, shown are different views showing examples of the ATDS 203 coupled to a mobile vehicle 212 and variations of the components of the ATDS 203. The ATDS 203 comprises a viewing stage 248, a removal system 254, cameras 251, a GPS receiver 239, a shaking system 245, and motors/actuators 257. FIG. 3 illustrates a front view of an example ATDS 203 according to various embodiments. FIG. 4 illustrates an example of a side view of the ATDS 203 according to various embodiments of the present disclosure. FIG. 5 illustrates an example of a back view of the ATDS 203 according to various embodiments. FIG. 6 illustrates a top view of the ATDS 203 according to various embodiments of the present disclosure. FIG. 6 further illustrates the different positions and movements for each of the different systems of the ATDS 203 as denoted by the arrows.

Figure 7:
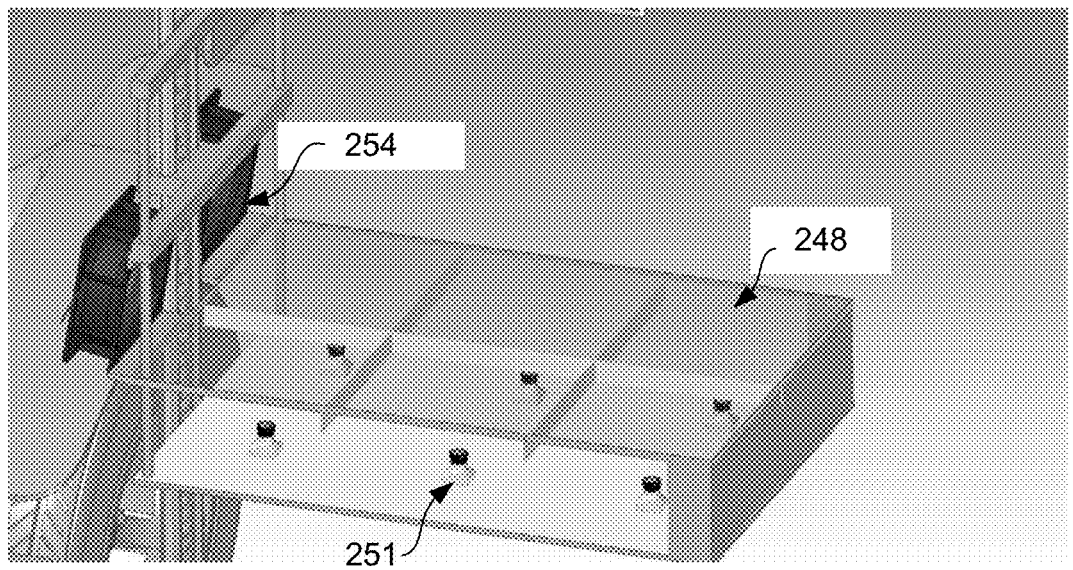
Figure 8:
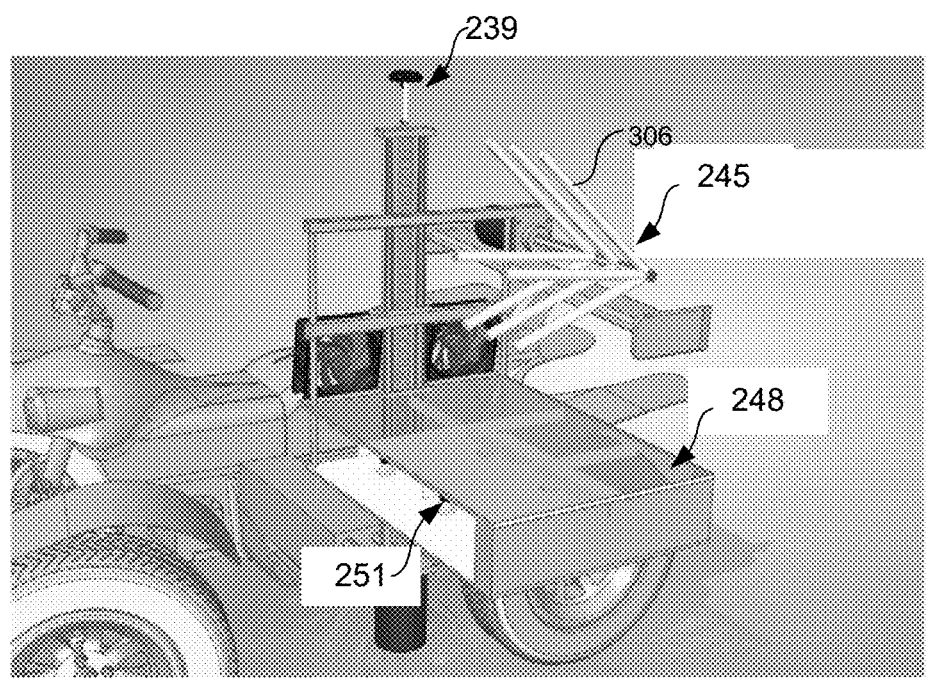
Figure 9:
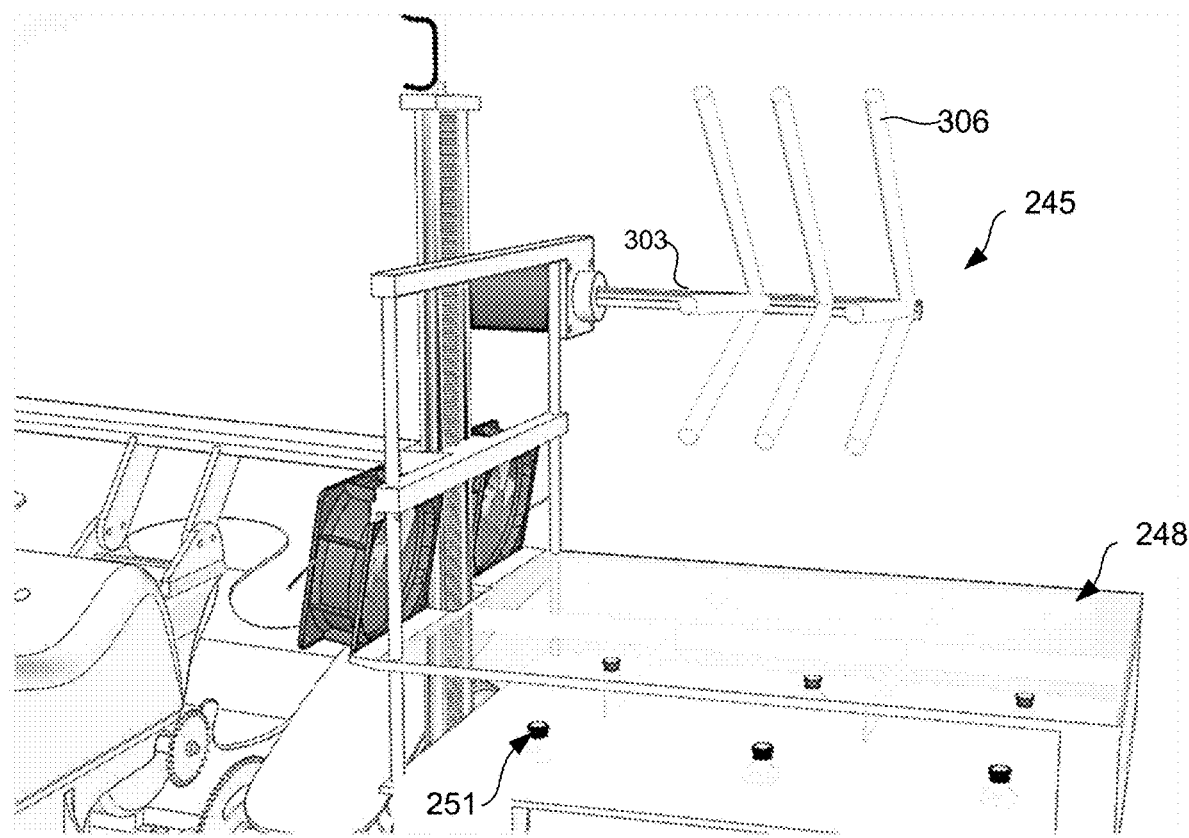

FIG. 7 illustrates an example of a viewing stage 248 according to various embodiments of the present disclosure. FIG. 7 differs from FIGS. 3-6 in that the cameras 251 are located under a transparent panel of the viewing stage 248. FIG. 8 illustrates another example of the ATDS 203, including the viewing stage 248 of FIG. 7 according to various embodiments of the present disclosure. FIG. 9 illustrates another example of the ATDS 203, including the viewing stage 248 of FIG. 7 according to various embodiments. FIG. 9 further illustrates a shaking system 245 composing multiple paddle components 306 extending from the primary rod 303 and being offset at different angles. FIGS. 10A and 10B are photographs illustrating a front view and a rear view of another example of an ATDS 203 according to various embodiments of the present disclosure.

FIG. 11 is photograph of an example of an ATDS 203 illustrating the grid of cameras 251 being placed above the viewing stage 248 according to various embodiments of the present disclosure. FIG. 12 is a photograph of the viewing stage 248 of the ATDS 203 of FIG. 11. FIG. 12 further illustrates a removal system 254 comprising compressed air nozzles for cleaning the viewing stage 248. FIG. 13 is a photograph further illustrating the components (e.g., primary rod 303, paddle components 306, pneumatic cylinder 309) of the shaking system 245 according to various embodiments of the present disclosure.

Figure 15:
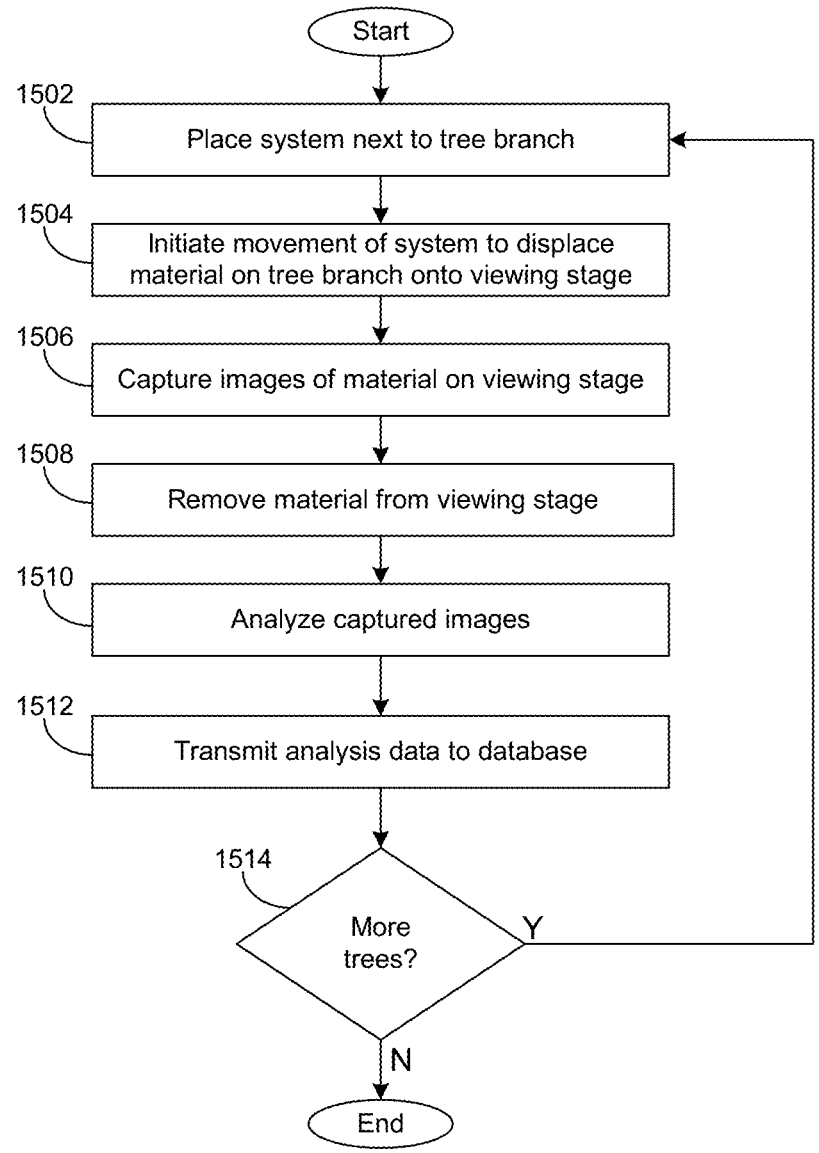
FIG. 15 is a flowchart illustrating one example of a method associated with the ATDS, in accordance to various embodiments of the present disclosure.

Referring next to FIG. 15, shown is a flowchart that provides one example of a method associated with the operation of the ATDS 203 according to various embodiments. It is understood that the flowchart of FIG. 15 provides merely an example of the many different types of functional arrangements that may be employed to implement the operation of the ATDS 203 as described herein.

At reference numeral 1502, the ATDS 203 is positioned next to a tree branch. For example, the mobile vehicle 212 moves to position the ATDS 203 next to a tree branch. In addition, the position of the shaking system 245, ATDS 203, and/or viewing stage 248 can be moved as needed to ensure proper positioning against the tree branch. At box 1504, the shaking system 245 is activated to displace material from the tree branch onto the viewing stage 248. For example, the shaking system 245 can be configured to tap, rotate, and/or vibrate against the tree branch to displace the material from the tree branch onto the viewing stage 248.

At reference 1506, the images of the material on the viewing stage 248 are captured via the one or more cameras 251. At reference numeral 1008, the material is removed from the viewing stage 248 via the removal system 254. At reference numeral 1510, the image analysis application 260 applies the various machine learning models to detect, identify, and count the number of insects in each of the captured images. At reference numeral 1512, the analysis data is transmitted to the remote database 215. The analysis data can include the type of deposits (e.g., insects) detected, the number of deposits detected, the location of the detection, the date/time of the detection, the captured image, and/or any other data as can be appreciated. At reference numeral 1514, it is determined whether there are additional trees to analyze. If there are other trees to analyze, the method proceeds to reference numeral 1502. Otherwise, the method ends.

Example 1

Tapping Mechanism (Shaking System 245)

A mechanism 245 was developed to perform a fast and consistent tapping on tree's branches. A pneumatic cylinder 309 (Baomain Electric SC63X50, Yueqing City, China) with a stroke of 50 mm (2 inches) and 63.5 mm (2.5 inches) bore was used to turn a shaft 303 connected to two steel tapping rods 306 of 8 mm diameter and 0.6 m length (FIG. 13). The rods 306 have a stroke of 80 degrees and were measured to achieve a speed of 8 m/s on their ends during the tapping procedure.

Viewing Board (Viewing Stage 248)

An acrylic opaque white board with dimensions 0.45× 0.22 m was used to collect the fallen ACPs for visualization (FIG. 12). The board of the viewing stage 248 was chosen to be easy to clean and to reduce reflectance effects.

Grid of Cameras

For the image acquisition task, a grid of six high resolution USB cameras 251 was used. The cameras 251 were placed so that each camera 251 would cover a 0.15×0.11 m area of the viewing stage 248 (FIG. 14). The camera module utilized (Spinel UC80MPA_ND, Irvine, Calif., USA) has 8 megapixels of resolution (3264×2448) and a lens of 3.6 mm focal length. The grid was placed 0.14 m above the viewing stage 248. The cameras 251 were configured to acquire one channel images (greyscale) to reduce image processing operations, as there was no relevant color information on one psyllid for the utilized resolution.

Camera's Processor

In order to capture images at the same time in all six cameras (within a 0.3 s tolerance), an individual processor unit 252 was used in each camera module to control the image acquisition. The processors 252 used were the Raspberry Pi v3 (Model B, Raspberry Pi Foundation, Cambridge, UK), connected to each respective camera 251 through a USB cable. All the processors 252 were connected to each other through general-purpose input/output (GPIO) pins to trigger them at the same time. One of the processors was also connected to the pneumatic cylinder valve (to control the valve).

A software was created on the processors 252 to trigger the shaking system 245 two times within 0.5 s and then to trigger the image acquisition 0.5 s after the second tap. This delay was found to be suitable after trial-and-error tests as it is enough time for the insects to fall on the viewing stage 248, but it is not long enough so that insects start to fly away. It is important to have a consistent and fast tapping as the ACPs fly off the viewing stage 248 only seconds after falling.

2.2.5 RTK GPS Positioning

The GPS device 239 can comprise a real-time kinematic (RTK) GPS device (e.g., TOPCON HiperXT) to provide position coordinates of each scouted tree. The device positioning accuracy is around 0.02 m, which is suitable to locate and distinguish between trees. In the example, the image analysis application 260 integrated the GPS location and the ACPs detection results to automatically generate maps of the scouted area results.

ACP Detection Software (Image Analysis Application 260)

After the image collections in the field, the acquired images were sent to an NVIDIA Jetson TX2 embedded computational unit (NVIDIA TX2 Developer Kit, Santa Clara, Calif., USA) to be processed on a developed software. The software was developed in C to be a fully automated process. First the six images 236 (one image per camera) are merged together to form a full picture of the viewing stage 248 with resolution of 9792×4896 pixels. The ACP detection process is divided in two stages of image detection using deep convolutional neural networks.

Figure 16:
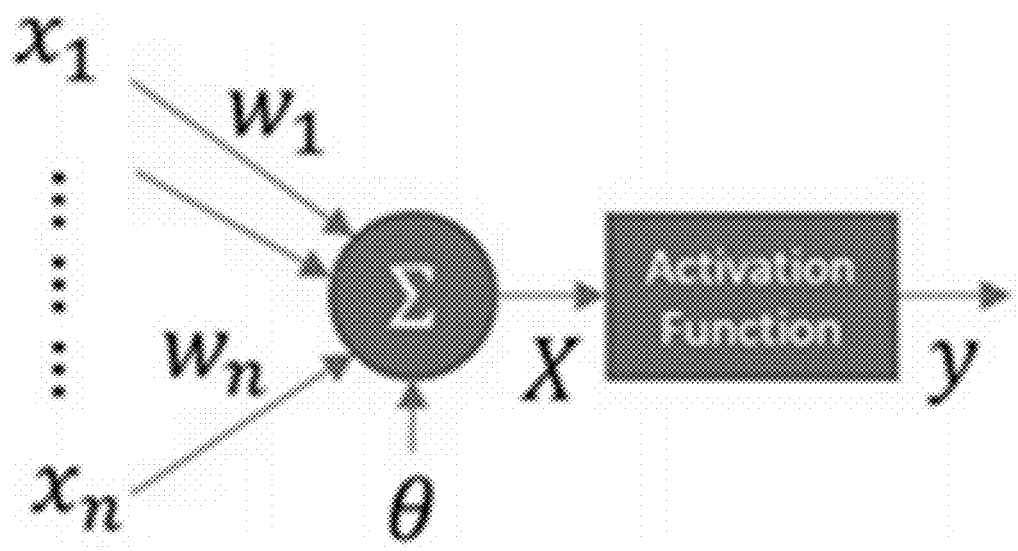
FIG. 16 illustrates a representation of a single neuron on a neural network according to various embodiments of the present disclosure.

A neural network consists of many ordered layers of neurons. The input signals are propagated sequentially from the first layer to the end layer of the network to produce an output result. Each neuron contains a weight values vector $\vec{w}$ that is used to process the input stimulus $\vec{x}$ and a bias term θ that will add to the operation to produce its output as described by Equation 1 and FIG. 16. FIG. 16 illustrates a representation of a single neuron on a neural network. A neuron receives inputs x and holds weights w; θ is the bias term. The resulting element X is the dot product of x and w plus the bias term. It is thresholded by the activation function to produce the output y.

The first layer of the network receives the three-dimensional matrix representation of the input image and the end layer output the confidence value of the membership of a sample into a particular population.

$$X = x_1 w_1 + \ldots + x_n w_n + \quad (1)$$

CNNs are optimized networks for image recognition tasks. Generally, a CNN will train itself to apply multiple filters on an input image to try to extract relevant features (e.g. traces, shapes) for the classification. The output matrices of the filters are multiplied to be propagated on the network. The multiplication of two matrices is known as convolution, hence the name convolutional neural networks.

First CNN ACP Detection

A first deep learning convolutional neural network was trained using YOLOv3 (You Only Look Once), a state-of-the-art object detection system. YOLOv3 is a single-stage method for object detection consisting of 106 fully connected neural layers. A training set of 800 labeled images 236 was prepared by capturing images of ACPs on a white background. The network was trained for 10,000 iterations using a common learning rate of 0.01.

The first CNN was found to be fast and sensitive to predict and locate possible ACP objects, but it was not very accurate in doing so. In other words, it showed a great performance on recall (sensitiveness) but not on precision (accuracy). For this reason, the first CNN was used to predict all possible ACP objects position to be later filtered by a second fine-tuned CNN. An empirical threshold of 0.001 was utilized on this first CNN object detection.

Second CNN ACP detection

After obtaining the possible ACP objects position from the first CNN detection, each object is cropped into a 64×64 pixels image, which was found to be an ideal image size to contain an individual adult ACP. The cropped images are then normalized to reduce light variance effects on the grid.

A second CNN was trained using YOLOv1, which is a previous version of YOLOv3 that has twenty-four (24) convolutional layers instead of 106 on the newer version. The smaller network was empirically found to be more suited for the image classification on 64×64 pixels resolution. This observation is possibly explained by the fact that the 106 layers network has too many weight's variables to be configured for a 64×64 input image classification, generating overfitting. A training set was collected and labeled of around 8,000 64×64 pixel's images including individual ACP as well as other collected insect and debris from tree's branches on a white background. The network was trained for 4,000 iterations using a learning rate of 0.001, empirical values that were found to reduce overfitting. An empirical detection threshold of 0.4 was used to classify the images into ACP or other (e.g. debris).

Experimental Design

All the tests were performed at the University of Florida's Southwest Florida Research and Education Center (SWFREC) located in Immokalee, Fla., USA. The grove used to evaluate the developed technology contains eight (8) rows of 80 m length with two different citrus varieties, Valencia and Swingle citrumelo, being 18 months old at the date of the experiment. The ATDS 203 was attached to a motor vehicle 212 (e.g., an John Deere Gator™ ATV) to move it around the field.

Figure 17:
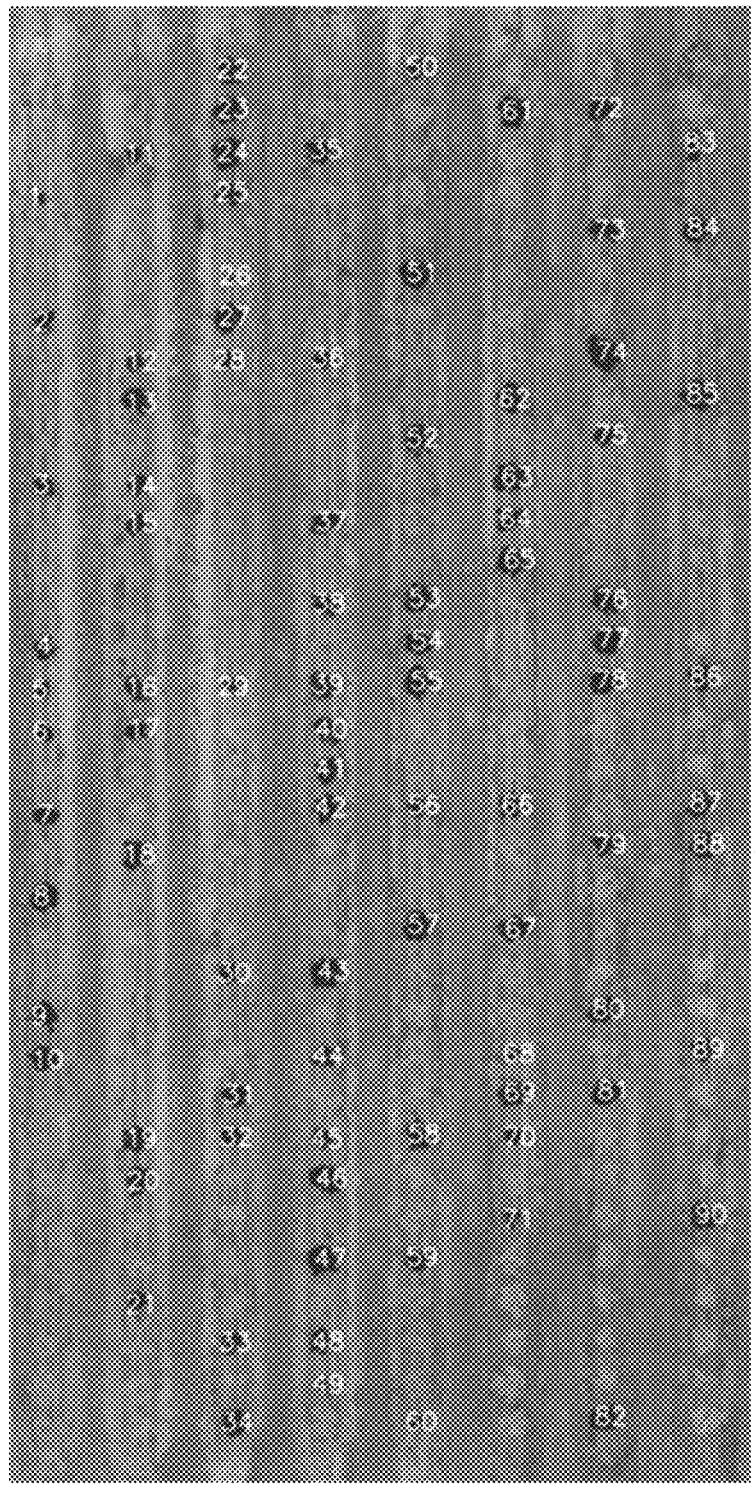
FIG. 17 is an example of an aerial map with the identification of each scouted tree according to various embodiments of the present disclosure.
Figure 18:
FIG. 18 is a photograph of an ATDS agitating a tree branch according to various embodiments of the present disclosure.

The experiment was conducted by randomly selecting ninety (90) trees between the eight (8) rows of the field (FIG. 17). Previously, an unmanned aerial vehicle (UAV) equipped with a multispectral camera was used to fly above the study area and obtain an aerial picture for better visualization of the collected ACP data. A vision-based technique was utilized to automatically detect all trees and measure their canopy size. FIG. 17 shows the aerial map with the identification of each scouted tree. For each analyzed tree the ATV was parked on its side to perform the scouting. The system of the present disclosure was then activated to perform the tree's branch tapping and image acquisition (FIG. 18). The images were later processed using the CNNs to detect the ACPs.

Figure 19:
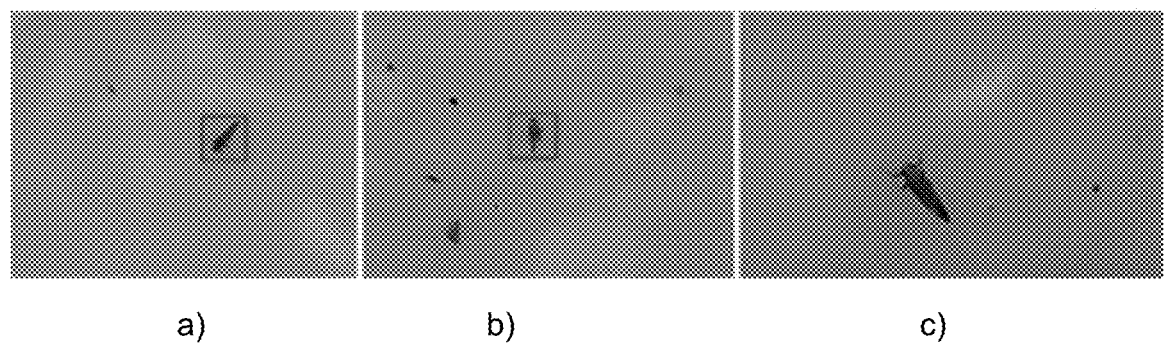
FIG. 19 illustrates example photographs showing various types of ACP detection according to various embodiments of the present disclosure.

To evaluate the performance of the detections each detected image was carefully examined through morphological observations to account for true positives, false positives and false negatives to calculate precision and recall. FIG. 19 presents an example of: (i) true positive, correct ACP detection (FIG. 19a), (ii) false positive, incorrect ACP detection (e.g. branch debris) (FIG. 19b) and (iii) false negative, incorrect ACP rejection (FIG. 19c). Furthermore, the f-score (harmonic mean of precision and recall) was used to evaluate the ACP detection accuracy too.

Results

Figure 20:
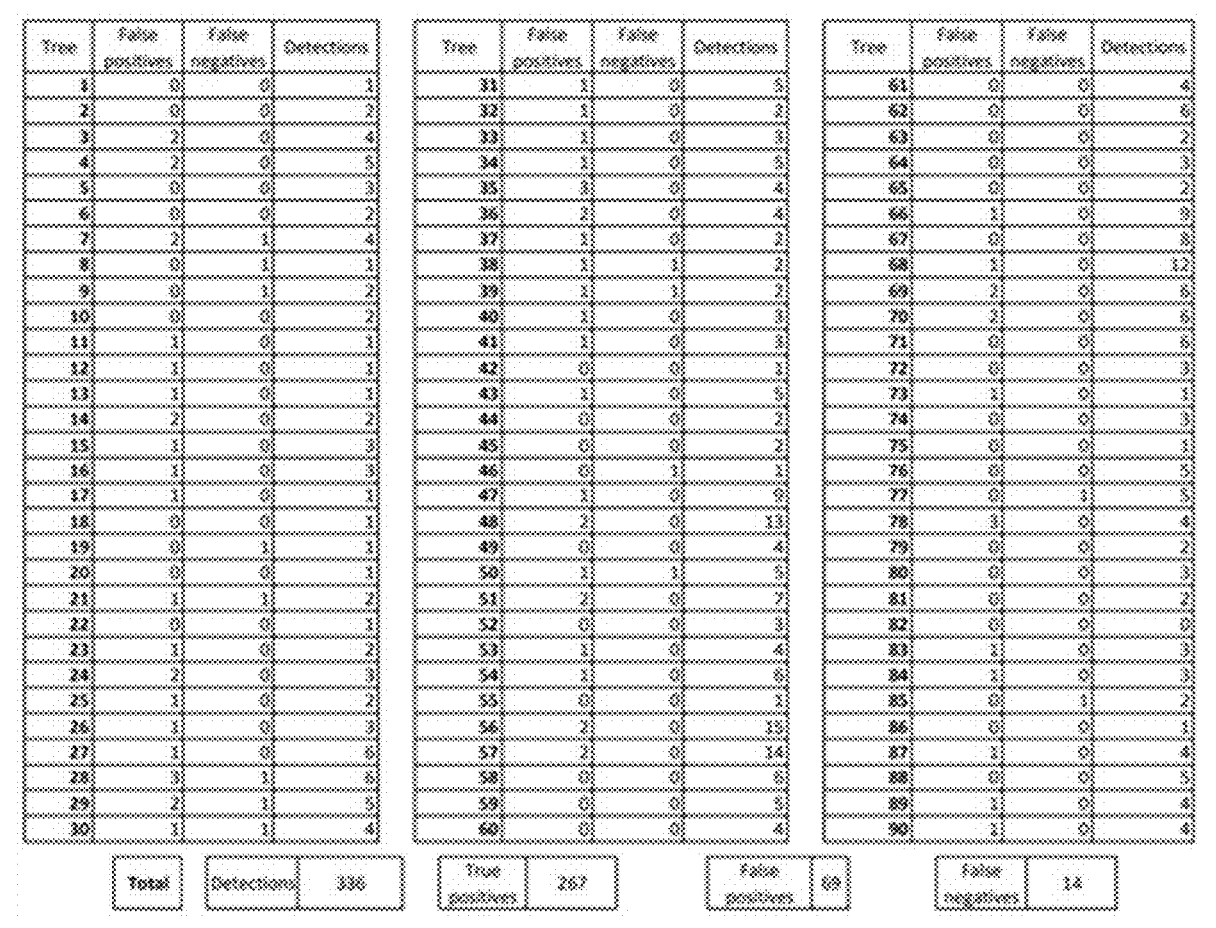

The results for the experiment on the 90 trees are shown in FIG. 20. A total of 267 true positive detections were counted, 69 false positives and 14 false negatives, which result in a precision and recall of 80% and 95%, respectively. The overall f-score result was 87%. The results show that the software performed better on ACPs sensitiveness (only 14 missed psyllids) than on accuracy (69 debris misidentified as ACPs), which shows that it was easier to detect ACPs than to distinguish an ACP from some similar shaped debris (or insects). The results accounted for adult ACPs only, ACP nymphs were not noted.

The results data shows a high variance between trees, from 0 to 15 ACPs, which can be explained by the fact that some trees were starting to flush at the experiment date and ACPs would concentrate more in these trees. The actual observed number of ACPs was 281, with an average of 3.1 ACPs per tree. On a different experiment, an average of 1.2 ACPs per tree (using the manual tapping method) were detected. Many factors are involved in the occurrence of ACPs (per tree) such as the tree location, weather conditions and tree growing stage (e.g., leaf flushing). Other factors that can explain the higher number of ACPs detected by the developed automated system are: (i) the viewing board is 60% larger than a letter-size paper sheet used in a manual tap method procedure, and (ii) the pneumatic tapping mechanism hits the tree branch stronger than the conventional tap which can also vary between individuals. The traditional tap method has been reported to be difficult to measure on large amount of ACPs per branch, as they fly off the pan shortly after falling.

Most of the misidentified ACPs were found to be small pieces of debris with a similar shape and size, which was challenging to distinguish on the utilized resolution even for a non-trained observer. Two main limitations were observed regarding the image acquisition, resolution and focus. Higher resolution images could help distinguish better ACP characteristics from debris, although the 48 megapixels resolution of the grid is already fairly high, providing an average 60×60 pixels resolution for an adult psyllid. The camera 251 focus was also found to be a limitation factor for a clearer image acquisition. As each camera's viewing area has a different distance to the lens (higher distance on corners of viewing area and shorter on the center); this produces differences in focus for each area. A possible solution for this would be increase the camera's height as it would reduce differences on the grid depth.

ACP Geo-Location

Figure 21:
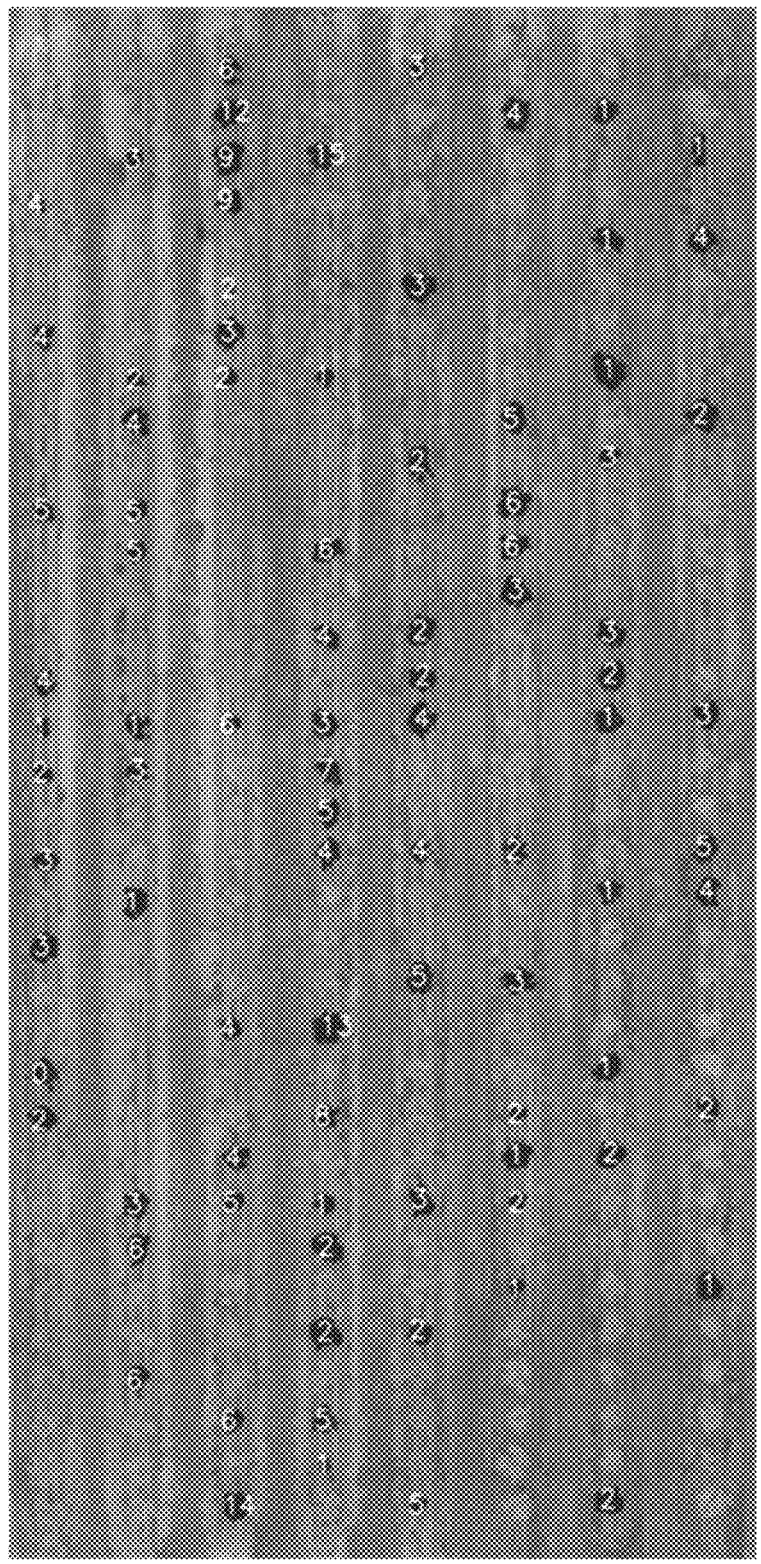
FIG. 21 is an example of an aerial map of each scouted tree in the experiment according to various embodiments of the present disclosure.

The position coordinates obtained from the GPS device 239 were saved for each tree at the moment of the scouting (in real-time). These data were used to create a map of the scouted trees in the field. FIG. 21 presents the detection ACP numbers for every randomly selected tree in this map. It has to be noted that each tree was assessed on a single branch, thus the detection results can be used as an estimate (the actual ACP population per tree might be higher). Multiple scouting on different branches of each tree can be done for a better estimation of the insect population per tree. The canopy size of each tree can be further used to investigate any correlations with ACP detections.

The present disclosure relates to a cost-effective automated system to detect, distinguish, count and geo-locate Asian citrus psyllid (ACP), among other deposits, in a citrus grove utilizing machine vision and artificial intelligence. The ATDS 203 of the present disclosure automates the conventional stem tap method for ACP scouting. The ATDS 203 comprises a shaking system 245 configured to hit the tree's branches so that insects fall over a viewing stage 248 with a grid of cameras 248 used for image acquisition. The ATDS computing device 242 to integrates the image analysis application 260 and the controller 263 with the physical components of the ATDS 203. The image analysis application 260 includes two convolutional neural networks to detect and distinguish ACPs from other insects and debris, integrated with a GPS device 239 to record position data for each tree and ACPs detection. In experiments, results obtained from ninety (90) trees in a citrus grove showed a precision and recall of 80% and 95%, respectively, on distinguishing ACPs from other debris materials.

A map of scouted trees data can be developed using the ATDS 203 for better visualization of the collected ACP detection data. The present disclosure shows a great potential on increasing accuracy and reducing labor costs on insect scouting procedures as diseases, like the HLB, continues to impose serious threats to citrus groves all over the world. The ATDS 203 of the present disclosure could benefit growers with more rapid and efficient monitoring of the Asian citrus psyllid populations in the tree canopy and therefore more effective management of this pest.

Figure 22:
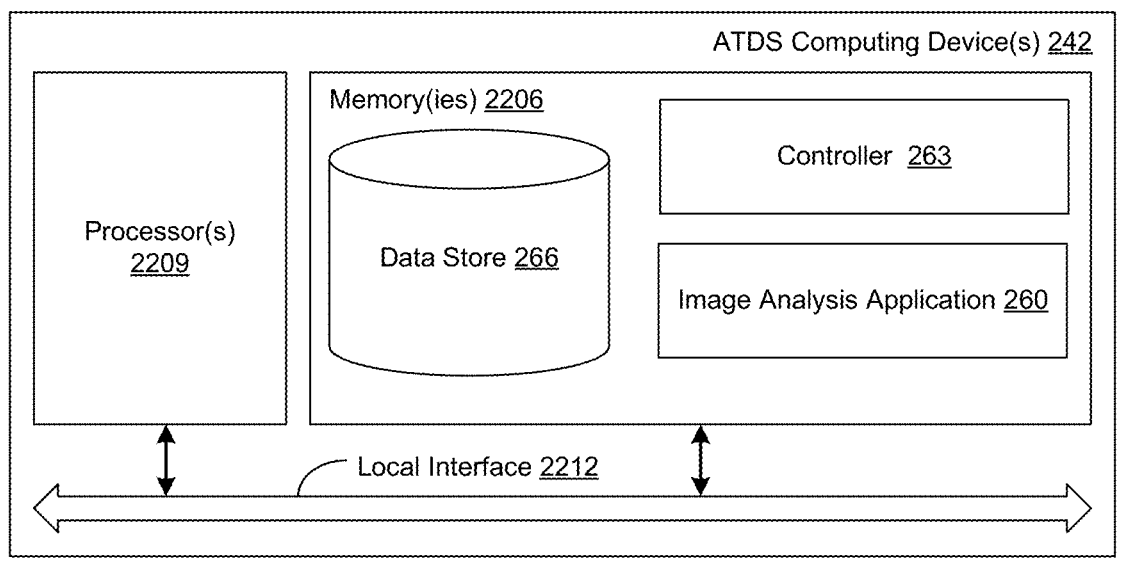
FIG. 22 is a schematic block diagram that provides one example illustration of an ATDS computing device according to various embodiments of the present disclosure.

With reference to FIG. 22, shown is a schematic block diagram of the ATDS computing environment according to an embodiment of the present disclosure. The computing environment includes one or more ATDS computing devices 242. Each computing device 242 includes at least one processor circuit, for example, having a processor 2209 and a memory 2206, both of which are coupled to a local interface 2212. To this end, each computing device 242 may comprise, for example, at least one server computer or like device. The local interface 2212 may comprise, for example, a data bus with an accompanying address/control bus or other bus structure as can be appreciated.

Stored in the memory 2206 are both data and several components that are executable by the processor 2209. In particular, stored in the memory 2206 and executable by the processor 2209 are the controller 263, the image analysis application 260, and potentially other applications. Also stored in the memory 2206 may be the ATDS data store 266 and other data. In addition, an operating system may be stored in the memory 2206 and executable by the processor 2209.

It is understood that there may be other applications that are stored in the memory 2206 and are executable by the processor 2209 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 2206 and are executable by the processor 2209. In this respect, the term "executable" means a program file that is in a form that can ultimately be run by the processor 2209. Examples of executable programs may be, for example, a compiled program that can be translated into machine code in a format that can be loaded into a random access portion of the memory 2206 and run by the processor 2209, source code that may be expressed in proper format such as object code that is capable of being loaded into a random access portion of the memory 2206 and executed by the processor 2209, or source code that may be interpreted by another executable program to generate instructions in a random access portion of the memory 2206 to be executed by the processor 2209, etc. An executable program may be stored in any portion or component of the memory 2206 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 2206 is defined herein as including both volatile and nonvolatile memory and data storage components. Volatile components are those that do not retain data values upon loss of power. Nonvolatile components are those that retain data upon a loss of power. Thus, the memory 2206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 2209 may represent multiple processors 2209 and/or multiple processor cores and the memory 2206 may represent multiple memories 2206 that operate in parallel processing circuits, respectively. In such a case, the local interface 2212 may be an appropriate network that facilitates communication between any two of the multiple processors 2209, between any processor 2209 and any of the memories 2206, or between any two of the memories 2206, etc. The local interface 2212 may comprise additional systems designed to coordinate this communication, including, for example, performing load balancing. The processor 2209 may be of electrical or of some other available construction.

Although the controller 263, image analysis application 260, and other various systems described herein may be embodied in software or code executed by general purpose hardware as discussed above, as an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 15 shows the functionality and operation of an implementation of portions of the controller and image analysis application. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 2209 in a computer system or other system. The machine code may be converted from the source code, etc. If embodied in hardware, each block may represent a circuit or a number of interconnected circuits to implement the specified logical function(s).

Although the flowchart of FIG. 15 shows a specific order of execution, it is understood that the order of execution may differ from that which is depicted. For example, the order of execution of two or more blocks may be scrambled relative to the order shown. Also, two or more blocks shown in succession in FIG. 15 may be executed concurrently or with partial concurrence. Further, in some embodiments, one or more of the blocks shown in FIG. 15 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the controller and the image analysis application, that comprises software or code can be embodied in any non-transitory computer-readable medium for use by or in connection with an instruction execution system, such as, for example, a processor 2209 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM), including, for example, static random access memory (SRAM) and dynamic random access memory (DRAM) or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the controller and the image analysis application, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device or in multiple computing devices.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. An automated tap and detection system, comprising:
   a mobile vehicle; and
   a mobile platform coupled to the mobile vehicle, the mobile platform comprising:
   a shaking system configured to agitate vegetation such that one or more loose deposits on the vegetation are released from the vegetation;
   a viewing stage positioned under the shaking system such that the one or more released loose deposits fall onto the viewing stage;
   one or more cameras being positioned with a field of view of the viewing stage, the one or more cameras being configured to capture one or more images of the viewing stage;
   a removal system configured remove the loose deposits from the viewing stage;
   a computing device being in data communication with the one or more cameras; and
   at least one application executable on the computing device, wherein, when executed, the at least one application causes the computing device to at least:
   receive the one or more images from the one or more cameras;
   detect one or more insects from the one or more images;
   identify an insect type of the one or more insects from the one or more images; and
   determine a quantity of the one or more insects in the one or more images.

2. The automated tap and detection system of claim 1, wherein the shaking system is configured to at least one of vibrate or rotate.

3. The automated tap and detection system of claim 1, wherein the one or more cameras comprise an array of cameras.

4. The automated tap and detection system of claim 1, wherein the one or more cameras are positioned at least one of: above the viewing stage, below the viewing stage, within the viewing stage, or to a side of the viewing stage.

5. The automated tap and detection system of claim 1, wherein, when executed, the at least one application further causes the computing device to at least:
   transmit insect data to a remote database, the insect data including the insect type and the quantity of the insects.

6. The automated tap and detection system of claim 5, wherein the insect data further comprises at least one of a location of the vegetation, a date and time associated with the detection of the images, or the one or more images.

7. The automated tap and detection system of claim 1, wherein the detection, identification, and counting of the insects is based at least in part on a machine learning model.

8. The automated tap and detection system of claim 7, wherein, when executed, the at least one application further causes the computing device to at least: train the machine learning model based at least in part on a collection of previously obtained images.

9. The automated tap and detection system of claim 1, wherein the shaking system comprises:
   a primary rod extending outwardly from and substantially perpendicular to a vertical frame of the mobile platform, the primary rod being configured to rotate about an axis of the primary rod; and
   one or more paddle components extending outwardly from and substantially perpendicular to primary rod, rotation of the primary rod causing a rotation of the one or more paddle components about the axis of the primary rod.

10. The automated tap and detection system of claim 1, wherein the viewing stage is at least one of: transparent or opaque.

11. A method, comprising:
    agitating, via a shaking system of an automated tap and detection system, a vegetation to displace material from the vegetation onto a viewing stage of the automated tap and detection system;
    capturing, via a camera system of the automated tap and detection system, one or more images of the viewing stage;
    removing, via a removal system of the automated tap and detection system, the material from the viewing stage;
    analyzing, via at least one computing device of the automated tap and detection system, the one or more images to detect one or more insects, identify the one or more insects, and count the one or more insects; and
    generating, via the at least one computing device, insect data comprising an identification of the one or more insects and a number of the one or more insects.

12. The method of claim 11, further comprising transmitting the insect data to a remote computing device.

13. The method of claim 11, wherein agitating the vegetation further comprises rotating a primary rod of the shaking system to cause one or more paddle components extending from the primary rod to agitate the vegetation.

14. The method of claim 11, wherein agitating the vegetation further comprises causing the shaking system to vibrate at a fixed frequency or a variable frequency.

15. The method of claim 11, wherein analyzing the one or more images comprises:
- detecting a first set of objects from the one or more images based on a first convolutional neural network (CNN) model;
- modifying the one or images based on the detection of the first set of objects; and
- detecting the one or more insects from the modified one or more images based on a second CNN model.

16. The method of claim 15, wherein the first CNN model is trained using a version of a You Only Look Once (YOLO) object detection system, and the second CNN model is trained using a different version of the YOLO object detection system.

17. The method of claim 11, wherein the camera system comprises a grid of cameras, the grid of cameras being positioned at least one of: above the viewing stage, below the viewing stage, to a side of the viewing stage, or within the viewing stage.

18. The method of claim 11, further comprising:
- determining a location of the one or more insects; and
- generating a map based on the location of the one or more insects and the insect data.

* * * * *